United States Patent
Hirozawa et al.

(10) Patent No.: US 9,616,390 B2
(45) Date of Patent: Apr. 11, 2017

(54) SEPARATION MEMBRANE, SEPARATION MEMBRANE ELEMENT, AND METHOD FOR PRODUCING SEPARATION MEMBRANE

(75) Inventors: Hiroho Hirozawa, Otsu (JP); Masakazu Koiwa, Otsu (JP); Kentaro Takagi, Otsu (JP); Yoshiki Okamoto, Otsu (JP); Hiroyuki Yamada, Otsu (JP); Yasuo Seike, Otsu (JP); Tsuyoshi Hamada, Otsu (JP); Masahiro Kimura, Otsu (JP)

(73) Assignee: Toray Industries, Inc. (JP)

( * ) Notice: Subject to any disclaimer, the term of this patent is extended or adjusted under 35 U.S.C. 154(b) by 428 days.

(21) Appl. No.: 14/131,231

(22) PCT Filed: Jul. 6, 2012

(86) PCT No.: PCT/JP2012/067311
§ 371 (c)(1),
(2), (4) Date: Jan. 7, 2014

(87) PCT Pub. No.: WO2013/005826
PCT Pub. Date: Jan. 10, 2013

(65) Prior Publication Data
US 2014/0151286 A1    Jun. 5, 2014

(30) Foreign Application Priority Data

Jul. 7, 2011  (JP) .................................. 2011-150600
Dec. 2, 2011  (JP) .................................. 2011-264504

(51) Int. Cl.
*B01D 69/10* (2006.01)
*B01D 69/12* (2006.01)
(Continued)

(52) U.S. Cl.
CPC ............. *B01D 69/10* (2013.01); *B01D 63/10* (2013.01); *B01D 69/12* (2013.01); *C02F 1/44* (2013.01);
(Continued)

(58) Field of Classification Search
CPC .... B01D 63/10; B01D 69/10; B01D 2313/08; B01D 2313/14; C02F 1/44; C02F 2103/08; C02F 1/441
See application file for complete search history.

(56) References Cited

U.S. PATENT DOCUMENTS 3,367,504 A   2/1968   Westmoreland
5,154,832 A   10/1992  Yamamura et al.
(Continued)

FOREIGN PATENT DOCUMENTS

EP   0 081 182   6/1983
EP   1 059 114   12/2000
(Continued)

OTHER PUBLICATIONS

English translation copy of Japanese Patent Application No. 2011-092905 A (May, 2011).*
(Continued)

*Primary Examiner* — John Kim
(74) *Attorney, Agent, or Firm* — DLA Piper LLP (US)

(57) ABSTRACT

A separation membrane includes a separation membrane main body having at least a substrate and a separation function layer; and a channel material having a composition different from that of the separation membrane main body and affixed to a substrate-side surface of the separation membrane main body, wherein the channel material is discontinuous in a first direction and continuous in a second direction from one end to another end of the separation membrane main body.

9 Claims, 4 Drawing Sheets

(51) Int. Cl.
  *B01D 63/10* (2006.01)
  *C02F 1/44* (2006.01)
  *C02F 103/08* (2006.01)

(52) U.S. Cl.
  CPC .......... *C02F 1/441* (2013.01); *B01D 2313/08* (2013.01); *B01D 2313/14* (2013.01); *C02F 2103/08* (2013.01)

(56) References Cited

U.S. PATENT DOCUMENTS

| | | | |
|---|---|---|---|
| 5,804,280 A | 9/1998 | Pall et al. | |
| 6,277,282 B1* | 8/2001 | Kihara | B01D 63/087 210/321.74 |
| 2010/0006504 A1* | 1/2010 | Odaka | B01D 63/103 210/651 |
| 2010/0193428 A1* | 8/2010 | Hane | B01D 69/10 210/489 |

FOREIGN PATENT DOCUMENTS

| | | |
|---|---|---|
| EP | 2 002 880 | 12/2008 |
| JP | 44-014216 B | 6/1969 |
| JP | 54-008179 A | 1/1979 |
| JP | 63-08503 A | 3/1988 |
| JP | 03-249907 A | 11/1991 |
| JP | 4-11928 A | 1/1992 |
| JP | 6-28703 B2 | 4/1994 |
| JP | 11-226366 A | 8/1999 |
| JP | 2000-051671 A | 2/2000 |
| JP | 2004-508170 A | 3/2004 |
| JP | 2006-247453 A | 9/2006 |
| JP | 2009-057654 A | 3/2009 |
| JP | 2010-099590 A | 5/2010 |
| JP | 2011-92905 | 5/2011 |
| WO | 2010/098803 A1 | 9/2010 |

OTHER PUBLICATIONS

European Search Report issued Nov. 10, 2014 from corresponding European Application No. 12807404.4.
Chinese Office Action of corresponding Chinese Application No. 201280033712.2 dated Feb. 28, 2015 with English translation.

* cited by examiner

SEPARATION MEMBRANE, SEPARATION MEMBRANE ELEMENT, AND METHOD FOR PRODUCING SEPARATION MEMBRANE

TECHNICAL FIELD

This disclosure relates to a separation membrane element adapted for use in separating components in a fluid such as liquid or gas.

BACKGROUND

In a technology for removing ionic substances in sea water, brackish water, and the like, in recent years, a method of separation by a separation membrane element is widely used as a process for energy conservation and natural resource saving. Separation membranes used for the method of separation by a separation membrane element are divided into a microfiltration membrane, an ultrafiltration membrane, a nanofiltration membrane, a reverse osmosis membrane, and a forward osmosis membrane in terms of its pore diameter or a separation function. These membranes are used, for example, in the production of drinking water from sea water, brackish water, water containing toxic substances, and the like, as well as in the production of industrial ultra-pure water, wastewater treatment, and recovery of valuables. The membranes used are selected depending on the target component to be separated as well as the separation performance.

Various forms exist for the separation membrane element, but they are common in that raw fluid is supplied to one surface of a separation membrane and permeate fluid is obtained from the other surface. The separation membrane element is configured by including many separation membranes bundled so that a membrane area per separation membrane element is increased, that is, so that an amount of permeate fluid to be obtained per separation membrane element is increased. As the separation membrane element, various forms such as a spiral type, a hollow fiber type, a plate and frame type, a rotating flat-sheet membrane type and an integrated flat-sheet membrane type are proposed according to uses and purposes.

For example, a spiral separation membrane element is widely used for reverse osmosis-filtration. The spiral separation membrane element includes with a central tube and a laminate wound around the central tube. The laminate is formed by laminating a channel material on the feed side for supplying raw fluid to the surface of the separation membrane, a separation membrane for separating components in the raw fluid, and a channel material on the permeate side for guiding the fluid on the permeate side, which permeates the separation membrane to be separated from the fluid on the feed side, to the central tube. The spiral separation membrane element is preferably used since it can provide pressure for the raw fluid and therefore a large amount of the permeate fluid can be drawn out.

In the spiral separation membrane element, in general, a polymer net is mainly used as a channel material on the feed side for the formation of a channel on the feed side fluid. Further, as the separation membrane, a laminate type separation membrane is used. The laminate type separation membrane is a separation membrane comprising a separation function layer of a crosslinkable high molecular weight compound such as polyamide, a porous resin layer of a high molecular weight compound such as polysulfone, and a nonwoven fabric of a high molecular weight compound such as polyethylene terephthalate, which are disposed in this order from the feed side to the permeate side. Further, a knit fabric member referred to as "tricot," which has a smaller channel interval than the channel material on the feed side, is used for the channel material on the permeate side for the purpose of preventing falling of the separation membrane and forming the flow path on the permeate side.

In recent years, improvement in performance of the membrane element has been demanded because of increasing requirement for reducing the cost of water production. To improve separation performance of the separation membrane element and to increase the amount of the permeate fluid produced per unit time, improvement in performance of members of the separation membrane element such as respective channel members has been proposed.

Specifically, JP 2006-247453 A proposes an element comprising a sheet member provided with projections and depressions as the channel material on the permeate side. JP 2010-099590 A proposes an element which does not require the channel material such as a net on the feed side or the channel material such as tricot on the permeate side by disposing a sheet-like separation membrane comprising a porous support having projections and depressions formed thereon and a layer having separation activity.

However, the separation membrane elements as described above are not sufficient in improving their performance, particularly in improving the stability of the separation performance over long term operations.

Thus, it could be helpful to provide a separation membrane and a separation membrane element which can stabilize separation/removal performance at the time when the separation membrane element is operated by particularly applying high pressure.

SUMMARY

We provide a separation membrane comprising: a separation membrane main body which has at least a substrate and a separation functional layer, and a different material which has composition different from that of the separation membrane main body and is affixed to a permeate side of the separation membrane such that the different material is discontinuous in a first direction, but is continuous in a second direction from one end to the other end of the separation membrane main body.

The separation membrane can be applied to a separation membrane element. The separation membrane element includes a water collection tube, and the separation membrane which is arranged such that the first direction is along an axial direction of the water collection tube and wound around the water collection tube.

It is thus possible to attain a high performance and high efficiency separation membrane element which can form a stable flow path on the permeate side with high efficiency, and has removal performance of the target component to be separated as well as high permeation performance.

DESCRIPTION OF REFERENCE SIGNS

Figure 1:
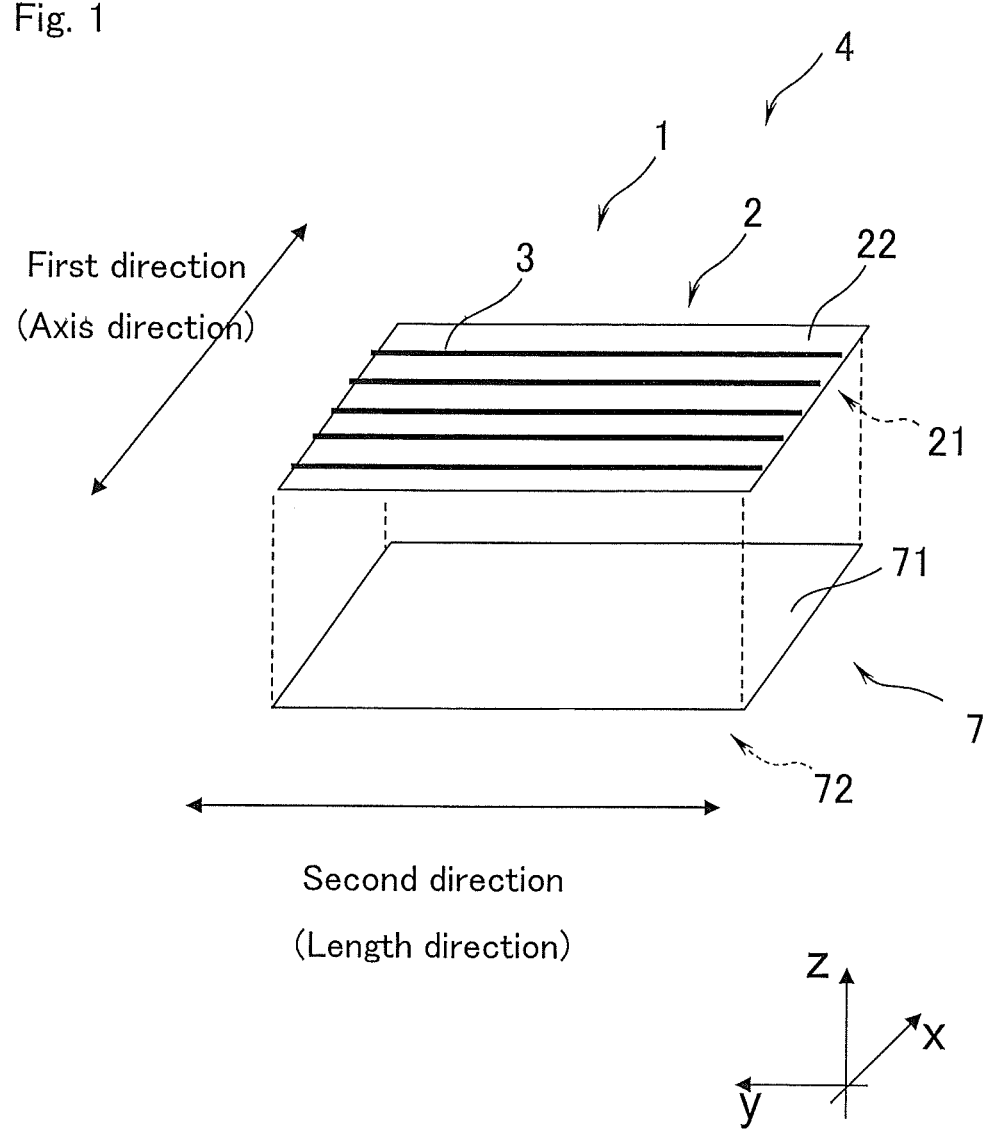
FIG. 1 is an exploded perspective view showing an example of a separation membrane leaf.

1: Separation membrane
2: Separation membrane main body
201: Substrate
202: Porous support layer
203: Separation functional layer
3: Channel material on permeate side
4: Separation membrane leaf
5: Flow path on permeate side
5: Channel material
6: Water collection tube
7: Separation membrane
21: Feed-side surface
22: Permeate-side surface
71: Feed-side surface
72: Permeate-side surface
100: Separation membrane element
a: Separation membrane (leaf) length
b: Interval between channel materials on permeate side in width direction
c: Difference in height between channel materials on permeate side
d: Width of channel material on permeate side
e: Interval between channel materials on permeate side in length direction
f: Length of channel material on permeate side
R2: Region including between front-end and tail-end of permeate-side channel material aligned from inner side of winding direction to outer side of winding direction in separation membrane
R3: Region where channel material on permeate side is not disposed in outer end in winding direction of separation membrane
L1: Length of whole separation membrane
L2: Length of region R2
L3: Length of region R3

DETAILED DESCRIPTION

Hereinafter, an example will be described in detail.
1. Separation Membrane
(1-1) Overview of Separation Membrane A separation membrane is a membrane which can separate components in fluid supplied to the surface of the separation membrane to obtain permeate fluid having permeated the separation membrane. The separation membrane includes a separation membrane main body and a channel material arranged on the separation membrane main body.

As an example of such a separation membrane, a separation membrane 1 includes, as shown in FIG. 1, a separation membrane main body 2 and a channel material 3 on the permeate side. The separation membrane main body 2 includes a feed-side surface 21 and a permeate-side surface 22.

Figure 7:
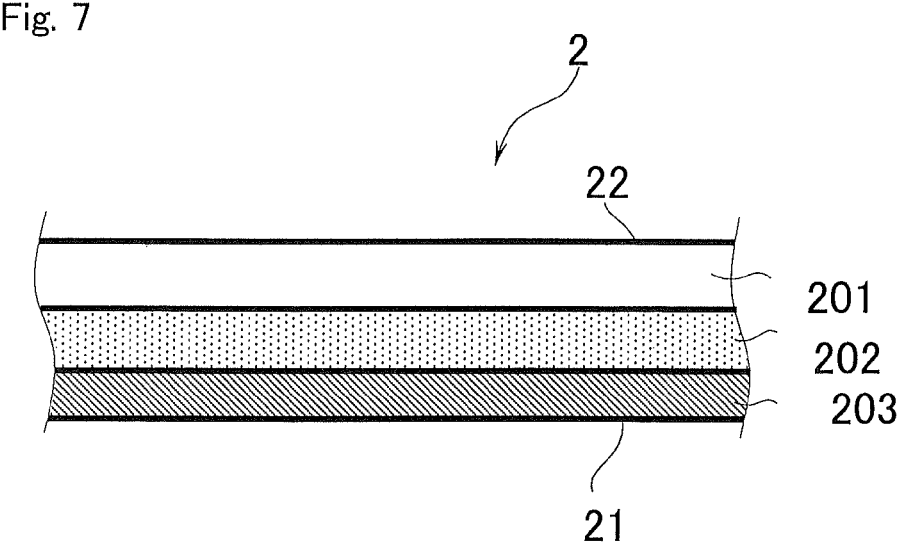
FIG. 7 is a sectional view showing a schematic constitution of a separation membrane main body.

In the specification, the "feed-side surface" of the separation membrane main body means a surface on the side, to which raw fluid is supplied, of two surfaces of the separation membrane main body. The "permeate-side surface" means a surface opposite to the feed-side surface. As described later, when the separation membrane main body includes a substrate 201 and a separation functional layer 203 as shown in FIG. 7, in general, the surface on a separation functional layer side is the feed-side surface, and the surface on a substrate side is the permeate-side surface.

A channel material 3 is disposed on the permeate-side surface 22 to form a flow path. A detail of the respective portions of the separation membrane 1 will be described later.

Directional axes of x-axis, y-axis and z-axis are shown in the drawings. The x-axis may be referred to as a first direction, and the y-axis may be referred to as a second direction. As shown in FIG. 1 or the like, a separation membrane main body 2 is rectangular, and the first direction and the second direction are parallel to an outer edge of the separation membrane main body 2. The first direction may be referred to as an axis direction, and the second direction may be referred to as a length direction.
(1-2) Separation Membrane Main Body
Overview As the separation membrane main body, a membrane having separation performance according to a method for using and an intended use is used. The separation membrane main body may be formed of a simple layer, or may be a composite membrane including a separation functional layer and a substrate. Further, as shown in FIG. 7, a porous support layer 202 may be formed between a separation functional layer 203 and a substrate 201 in the composite membrane.
Separation Functional Layer The thickness of the separation functional layer is not limited to a specific value, but it is preferably 5 nm or more and 3000 nm or less in view of the separation performance and the permeation performance. Particularly, in the case of the reverse osmosis membrane, the forward osmosis membrane, and the nanofiltration membrane, the thickness is preferably 5 nm or more and 300 nm or less.

The thickness of the separation functional layer may be measured in accordance with a conventional method that has been used insofar in measuring the thickness of the separation membrane. For example, an ultrathin section is prepared by embedding the separation membrane in a resin and slicing from the embedded membrane, and the resulting thin section is subjected to the staining or other necessary treatment. Thereafter, the section is observed with a transmission electron microscope and, thereby, the thickness can be measured. Further, when the separation functional layer has a pleated structure, the thickness can be determined by measuring the thickness in the longitudinal cross-sectional direction of the pleat structure for 20 pleats present above the porous support layer at an interval of 50 nm, and calculating the average from the 20 measurements.

The separation functional layer may be a layer having both of a function of separation and a function of support, or may have only the function of separation. In addition, the "separation functional layer" refers to a layer having at least the function of separation.

When the separation functional layer has both of the function of separation and the function of support, a layer containing, as the main component, cellulose, polyvinylidene fluoride, polyether sulfone or polysulfone is preferably applied as the separation functional layer.

In addition, "X contains Y as the main component" means that the content of the Y in the X is 50% by mass or more, 70% by mass or more, 80% by mass or more, 90% by mass or more, or 95% by mass or more. When a plurality of components corresponding to the Y are present, the total amount of the plurality of components may satisfy the range described above.

On the other hand, as the material used for the porous support layer-separation functional layer, a crosslinkable polymer is preferably used in view of ease of the control of the pore size and excellent durability. Particularly, in view of the excellent separation performance of components in the raw fluid, a polyamide separation functional layer prepared by polycondensation of a polyfunctional amine and a polyfunctional acid halide or an organic-inorganic hybrid functional layer is suitably used. These separation functional layers can be formed by polycondensation of monomers on the porous support layer.

For example, the separation functional layer may contain polyamide as the main component. Such a membrane is formed by interfacial polycondensation of a polyfunctional amine and a polyfunctional acid halide according to a publicly known method. For example, a polyfunctional amine aqueous solution is applied onto the porous support layer, and the excessive amine aqueous solution is removed with an air knife or the like. Thereafter, an organic solvent solution containing a polyfunctional acid halide is applied to obtain a polyamide separation functional layer.

Further, the separation functional layer may have an organic-inorganic hybrid structure containing Si element. The separation functional layer having the organic-inorganic hybrid structure can contain, for example, the following compounds (A) and (B):

(A) a silicon compound having a reactive group containing an ethylenic unsaturated group and a hydrolyzable group directly bonded to the silicon atom, and (B) a compound having an ethylenic unsaturated group other than the silicon compound (A) as described above. Specifically, the separation functional layer may contain a condensate of the hydrolyzable group of the compound (A) and a polymerization product of the ethylenic unsaturated group of the compound (A) and/or the compound (B). That is, the separation functional layer may contain at least one polymerization product of:
  a polymerization product formed by condensation and/or polymerization of only the compound (A);
  a polymerization product formed by polymerization of only the compound (B); and
  a copolymer of the compound (A) and the compound (B). In addition, the polymerization product includes a condensate. Further, the compound (A) may be condensed through a hydrolyzable group in the copolymer of the compound (A) and the compound (B).

The hybrid structure can be formed by a known method. An example of the method of forming the hybrid structure is as follows. A reaction liquid containing the compound (A) and the compound (B) is applied onto the porous support layer. After the excessive reaction liquid is removed, heating treatment may be performed to condense the hydrolyzable group. Heat treatment and irradiation with an electromagnetic wave, electron beams or plasma may be employed for a polymerization method of the ethylenic unsaturated group of the compound (A) and that of the compound (B). In the formation of the separation functional layer, a polymerization initiator, a polymerization promoter, or the like may be added for the purpose of increasing the polymerization rate.

In addition, a membrane surface of any separation functional layer may be hydrophilized, for example, with an aqueous solution containing alcohol or an alkali aqueous solution before use.

Porous Support Layer

A porous support layer is a layer which supports the separation functional layer, and is also referred to as a porous resin layer.

A material used for the porous support layer and a shape of the porous support layer are not particularly limited and, for example, the layer may be formed on the substrate by use of a porous resin. As the porous support layer, polysulfone, cellulose acetate, polyvinyl chloride, epoxy resin, or a mixture or a laminate thereof are used, and use of polysulfone is preferable in consideration of the high chemical, mechanical, and thermal stability and ease of controlling the pore size.

The porous support layer provides mechanical strength for the separation membrane and it does not have the separation performance for the component with small molecular size such as ions as in the case of the separation membrane. The pore size and pore distribution of the porous support layer are not particularly limited and, for example, the porous support layer may have uniform fine pores, or may have pore size distribution in which the pore size gradually increases from the surface on which the separation functional layer is formed to the other surface. Further, in any of these cases, an equivalent circle diameter from the projection of the fine pore measured at the surface, on which the separation functional layer is formed, by using an atomic force microscope, an electron microscope or the like is preferably 1 nm or more and 100 nm or less. Particularly, it is preferred that the pore at the surface, on which the separation functional layer is formed in the porous support layer, has an equivalent circle diameter of 3 nm or more and 50 nm or less in view of the reactivity in the interfacial polymerization and retention of the separation functional layer.

The thickness of the porous support membrane is not particularly limited, but it is preferably 20 μm or more and 500 μm or less, and more preferably 30 μm or more and 300 μm or less to provide strength for the separation membrane, or the like.

The morphology of the porous support layer can be observed by using a scanning electron microscope, a transmission electron microscope or an atomic force microscope. For example, when the porous support layer is observed by using the scanning electron microscope, the observation may be conducted by peeling the porous support layer off the substrate, and preparing a sample for observing the cross-section by cutting the porous support layer by freeze fracturing. This sample is thinly coated with platinum or platinum-palladium or ruthenium tetrachloride, and preferably ruthenium tetrachloride, and observed at an acceleration voltage of 3 kV to 6 kV by using a high resolution field emission scanning electron microscope (UHR-FE-SEM). As the high resolution field emission scanning electron microscopes, Model S-900 electron microscope manufactured by HITACHI LTD. can be employed. The layer thickness of the porous support layer and the projected area diameter on the surface can be measured by using the resulting electron micrograph.

The thickness of the porous support layer and the pore size are average values, and the thickness of the porous support layer is the average of 20 points obtained by observing the cross-section, and measuring 20 points at an interval of 20 μm in the direction perpendicular to the thickness direction of the membrane. The pore size is an average value of the projected area diameters obtained by measuring 200 holes.

Next, a method of forming the porous support layer will be described. The porous support layer can be produced, for example, by casting a solution of the polysulfone in N,N-dimethylformamide (hereinafter referred to as DMF) to a predetermined thickness on the substrate as described later, for example, a densely woven polyester or polyester nonwoven fabric, and then coagulating the cast solution in water by wet coagulation.

The porous support layer is formed according to the method described in "Office of Saline Water, Research and Development Progress Report," No. 359 (1968). In addition, to obtain the desired morphology, the polymer concentration, the solvent temperature, and the poor solvent can be adjusted.

For example, a predetermined amount of polysulfone is dissolved in DMF to prepare a polysulfone resin solution having a predetermined concentration. Then, the polysulfone resin solution is applied onto the substrate made of the polyester fabric or nonwoven fabric at a substantially constant thickness, and after leaving the substrate for a predetermined period in the atmosphere to remove the solvent on the surface, the polysulfone is coagulated in the coagulation solution, and thereby, the porous support layer can be obtained.

Substrate

The separation membrane main body may have a substrate from the viewpoint of the strength of the separation membrane main body and the size stability. As the substrate, a fibrous substrate is preferably used in view of strength, provision of projections and depressions and fluid permeability.

Both of a long fiber nonwoven fabric and a short fiber nonwoven fabric can be preferably employed as the substrate. Particularly, since the long fiber nonwoven fabric has an excellent membrane-forming property, it can suppress the possibility that when a solution of a high molecular weigh polymer is cast, the solution permeates to a backside due to overpermeation, that the porous support layer is peeled off, that the membrane becomes non-uniform due to fuzz of the substrate, and that the defect such as a pinhole is produced. Further, when the substrate is made of the long fiber nonwoven fabric composed of thermoplastic continuous filaments, it can suppress the possibility that the membrane becomes non-uniform due to fuzz of the fibers in casting a solution of a high molecular weigh compound, and a membrane defect is generated in comparison with the short fiber nonwoven fabric. Furthermore, since a tensile force is applied to a direction of membrane forming of the separation membrane when the separation membrane is continuously formed, it is preferred to use the long fiber nonwoven fabric having excellent dimensional stability as the substrate.

In the long fiber nonwoven fabric, it is preferred from the point of formability and strength that fibers at the surface layer opposite to the porous support layer-side surface layer are more vertically oriented than those at the porous support layer-side surface layer. When such a structure is employed, it is preferred because the high effect of preventing membrane break is realized by maintaining strength, formability of a laminate including a porous support layer and a substrate at the time of providing projections and depressions for the separation membrane is improved, and the morphology of the projections and depressions at the separation membrane surface becomes stable.

More specifically, the fiber orientation degree of the long fiber nonwoven fabric at the surface layer opposite to the porous support layer-side surface layer is preferably 0° or more and 25° or less, and the difference between this fiber orientation degree and a fiber orientation degree at the porous support layer-side surface layer is preferably 10° or more and 90° or less.

The production step of the separation membrane or the production step of the element includes a heating step, and a phenomenon occurs in which the porous support layer or the separation functional layer is shrunk by heating. The shrinkage is significant particularly in a width direction for which a tensile force is not provided in a continuous membrane forming. When the membrane is shrunk, since a problem of dimensional stability or the like arises, a substrate having a small thermal change rate of dimension is desired. When the difference between the fiber orientation degree at the surface layer opposite to the porous support layer-side surface layer and the fiber orientation degree at the porous support layer-side surface layer is 10° or more and 90° or less in the nonwoven fabric, it is preferred since changes in a width direction due to heat can also be prevented.

Herein, the fiber orientation degree is an index of an orientation of fibers of a nonwoven fabric substrate constituting the porous support layer. Specifically, the fiber orientation degree is an average value of angles between a membrane-forming direction in continuously producing a membrane, that is, a longitudinal direction of the nonwoven fabric substrate and the fibers constituting the nonwoven fabric substrate. That is, when the longitudinal direction of the fiber is parallel to the membrane-forming direction, the fiber orientation degree is 0°. When the longitudinal direction of the fiber is perpendicular to the membrane-forming direction, that is, parallel to a width direction of the nonwoven fabric substrate, the fiber orientation degree is 90°. Therefore, it is shown that the closer to 0° the fiber orientation degree is, the more the fibers are vertically oriented, and the closer to 90° the fiber orientation degree is, the more the fibers are horizontally oriented.

The fiber orientation degree is measured as follows. First, 10 small samples are taken at random from a nonwoven fabric. Then, the surface of the sample is photographed at a magnification of 100 times to 1000 times by using a scanning electron microscope. Ten fibers per sample are selected in the photographed image, and an angle of the fiber at the time when the longitudinal direction (machine direction, direction of membrane formation) of the nonwoven fabric is taken as 0° is measured. That is, angles of 100 fibers per nonwoven fabric are measured. An average value is calculated from the angles of 100 fibers measured in this way. A value obtained by rounding the resulting average value to the closest whole number is the fiber orientation degree.

The thickness of the substrate is preferably set to such a level that the total thickness of the substrate and the porous support layer is 30 μm or more and 300 μm or less, or 50 μm or more and 250 μm or less.

(1-3) Channel Material on Permeate Side

Overview

A channel material is disposed on the permeate-side surface of the separation membrane main body to form a flow path on the permeate side. The term "disposed to form a flow path on the permeate side" means that when the separation membrane is incorporated into a separation membrane element described later, a channel material is formed such that permeate fluid having permeated the separation membrane main body can reach a water collection tube. A detail of a constitution of the channel material is as follows.

Constituent Component of Channel Material

The channel material 3 is preferably formed of a material different from that of the separation membrane main body 2. The different material means a material having composition different from that of a material used in the separation membrane main body 2. Particularly, the composition of the channel material 3 is preferably different from the composition of a surface of the separation membrane main body 2, on which the channel material 3 is formed, and is preferably different from the composition of any layer constituting the separation membrane main body 2.

A constituent component of the channel material is not particularly limited, and a resin is preferably used for the component. Specifically, an ethylene-vinyl acetate copolymer resin, polyolefins such as polyethylene and polypropylene, and copolymerization polyolefins are preferable in view of chemical resistance, and polymers such as urethane resins and epoxy resins can be selected, and these can be used singly or as a mixture composed of two or more thereof. Particularly, thermoplastic resins can form a channel material having a uniform shape since it is easily formed.

Shape and Arrangement of Channel Material

Overview

Tricot which has been widely used is a knitted fabric, and composed of yarns three-dimensionally crossing one another. That is, the tricot has a continuous structure as viewed two-dimensionally. When such tricot is applied as the channel material, the height of the flow path is smaller than the thickness of the tricot. That is, it is not possible to utilize all of the thickness of the tricot as the height of the flow path.

In contrast, the channel material 3 shown in FIG. 1 or the like, which is an example of the constitution, is arranged to not overlay one another. Therefore, all of the height (namely, thickness) of the channel material 3 is utilized as the height of a groove of the flow path. Accordingly, when the channel material 3 is applied, the height of the flow path is higher than that in the case of tricot having a thickness similar to the height of the channel material 3. That is, since a cross-sectional area of the flow path of the channel material 3 is larger, the flow resistance is smaller.

Further, in the examples shown in the respective drawings, a plurality of discontinuous channel materials 3 are affixed onto one separation membrane main body 2. The term "discontinuous" is a state in which a plurality of channel materials are disposed at intervals. That is, when the channel material 3 in one separation membrane is peeled off from the separation membrane main body 2, a plurality of channel materials 3 which are separated from one another are obtained. In contrast, the member such as a net, tricot or a film shows a continuous integral shape even when being separated from the separation membrane main body 2.

Since a plurality of discontinuous channel materials 3 are disposed, a pressure loss can be kept low when the separation membrane 1 is incorporated into a separation membrane element 100 described later. In one example of such a constitution, the channel material 3 is discontinuously formed only in the first direction in FIG. 2, and the channel material 3 is discontinuously formed in any of the first direction and the second directions in FIG. 3.

The separation membrane is preferably arranged such that the second direction agrees with the winding direction in the separation membrane element. That is, in the separation membrane element, it is preferred that the separation membrane is arranged such that the first direction is parallel to the axial direction of the water collection tube 6 and the second direction is perpendicular to the axial direction of the water collection tube 6.

Figure 5:
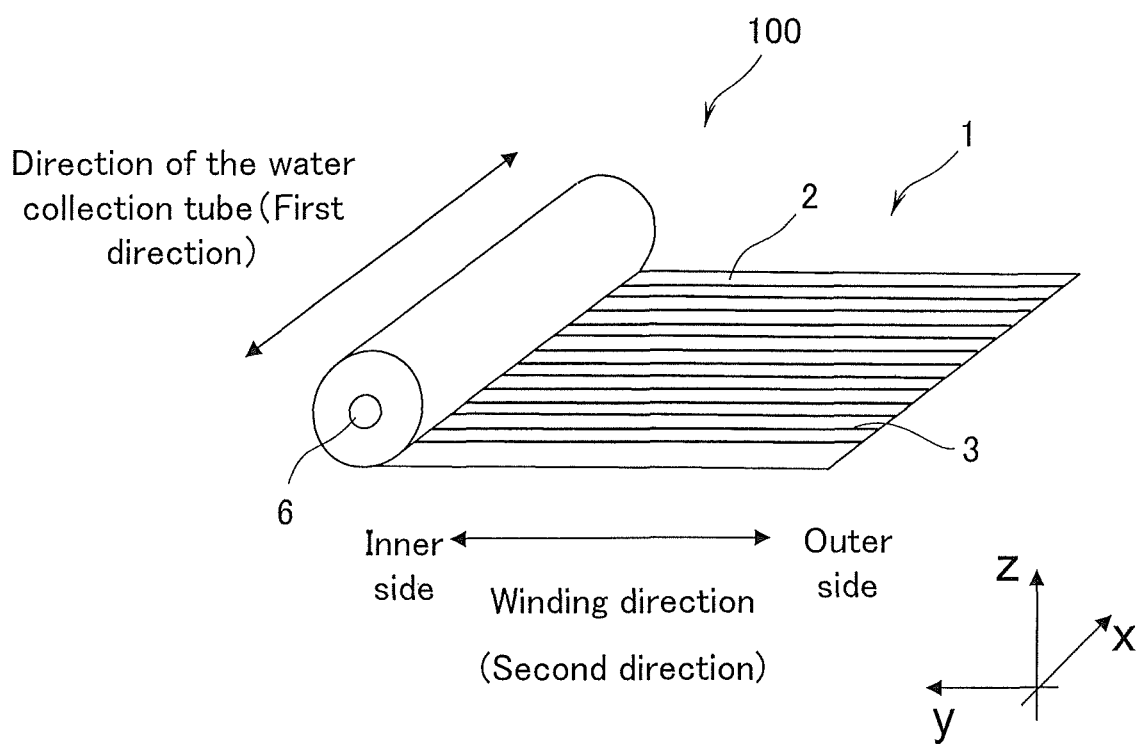
FIG. 5 is a developed perspective view showing an example of a separation membrane element.

The channel material 3 is arranged such that the channel material is discontinuous in the first direction, and is continuous in the second direction from one end to the other end of the separation membrane main body 2. That is, as shown in FIG. 5, when the separation membrane is incorporated into the separation membrane element, the channel material 3 is arranged such that the channel material is continuous from the inner end to the outer end of the separation membrane 1 in a winding direction. The inner side in the winding direction is a side close to the water collection tube in the separation membrane, and the outer side in the winding direction is a side away from the water collection tube in the separation membrane.

Figure 2:
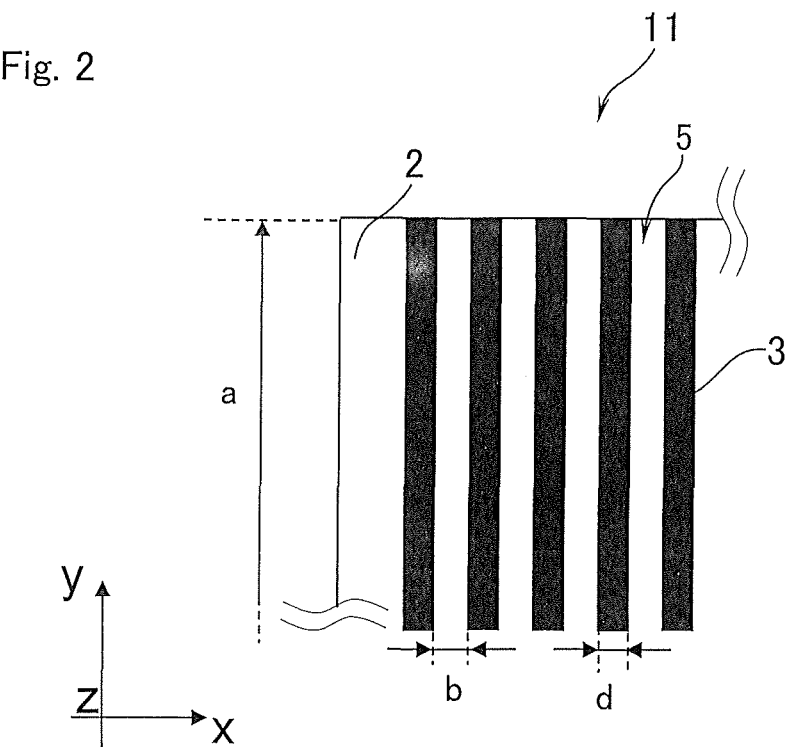
FIG. 2 is a plan view showing a separation membrane provided with a channel material continuously disposed in a length direction (second direction) of the separation membrane.
Figure 3:
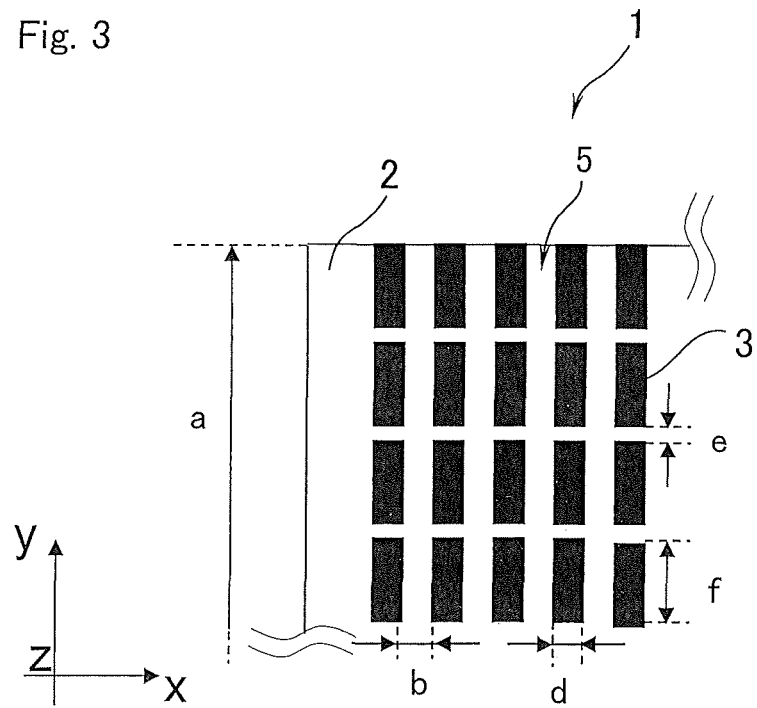
FIG. 3 is a plan view showing a separation membrane provided with a channel material discontinuously disposed in a length direction (second direction) of the separation membrane.

The matter that the channel material "is continuous in the second direction" comprehends both of the case where the channel material is disposed without discontinuity as shown in FIG. 2 and the case where the channel material is substantially continuous although it is discontinuous at some points as shown in FIG. 3. The morphology of "substantially continuous" preferably satisfies that the interval e between the channel materials (namely, a length of a discontinuous portion in the channel material) in the second direction is 5 mm or less. Particularly, the interval e more preferably satisfies 1 mm or less, and moreover preferably satisfies 0.5 mm or less. Further, the total value of the intervals e included between the front-end and the tail-end of a row of the channel material aligned in the second direction is preferably 100 mm or less, more preferably 30 mm or less, and moreover preferably 3 mm or less. In addition, in the example of FIG. 2, the interval e is zero (0).

When the channel material 3 is disposed without discontinuity as shown in FIG. 2, falling of the membrane is suppressed at the time of pressurized filtration. The falling of the membrane means that the membrane falls into the flow path to narrow the flow path.

In FIG. 3, the channel material 3 is discontinuously formed not only in the first direction but also in the second directions. That is, the channel material 3 is disposed at intervals in a length direction. However, as described above, since the channel material 3 is substantially continuous in the second direction, falling of a membrane is prevented. Further, since the channel material 3 which is discontinuous in two directions like this is disposed, a contact area between the channel material and the fluid is decreased, and therefore a pressure loss is reduced. This morphology can also be said to be in other words a constitution in which the flow path 5 is provided with branch points. That is, in the constitution shown in FIG. 3, the permeate fluid is divided by the channel material 3 while flowing through the flow path 5, and divided flows can join into one in the downstream parts.

As described above, in FIG. 2, the channel material 3 is arranged such that the channel material 3 is continuous in the first direction from one end to the other end of the separation membrane main body 2. In FIG. 3, the channel material 3 is divided into a plurality of portions in the first direction, and these plural portions are arranged in a line from one end to the other end of the separation membrane main body 2.

The matter that the channel material "is arranged from one end to the other end of the separation membrane main body" comprehends both of the morphology in which the channel material is disposed up to the edge of the separation membrane main body 2 and the morphology in which the channel material is not disposed in some regions in the vicinity of the edge. That is, the channel material may be distributed over the second direction to such an extent that the flow path on the permeate side can be formed, and the channel material may not be disposed in some areas in the separation membrane main body. For example, the channel material does not need to be disposed at an area where the permeate-side surface is bonded to another separation membrane. Further, a region not provided with the channel material may be arranged at some locations such as the end of the separation membrane for another specification or production reasons.

The channel material 3 can be almost uniformly distributed throughout the separation membrane main body also in the first direction. However, as with the distribution in the second direction, the channel material does not need to be disposed at an area where the permeate-side surface is bonded to another separation membrane. Further, a region not provided with the channel material may be arranged at some locations such as the end of the separation membrane for another specification or production reasons.

Dimensions of Separation Membrane Main Body and Channel Material

Figure 4:
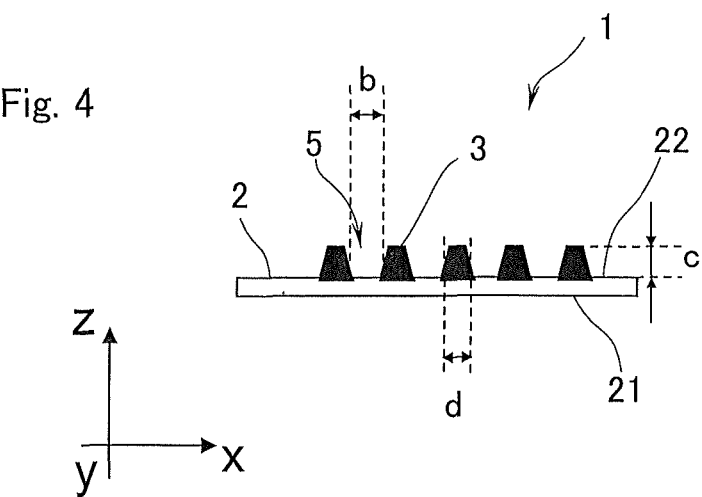
FIG. 4 is a sectional view of the separation membrane of FIGS. 2 and 3.

As shown in FIGS. 2 to 4, a to f indicate the following values:
- a: Length of the separation membrane main body 2
- b: Interval between the channel materials 3 in a width direction of the separation membrane main body 2
- c: Height of the channel material (difference in height between the channel material 3 and the permeate-side surface 22 of the separation membrane main body 2)
- d: Width of the channel material 3
- e: Interval between the channel materials in a length direction of the separation membrane main body 2
- f: Length of the channel material 3.

For measurement of the values a to f, for example, a commercially available shape measurement system, microscope or the like can be used. Each value is determined by measuring 30 points or more in one separation membrane, summing these measured values, and dividing the sum by the number of points measured to calculate the average. Each value thus obtained as a result of measurement at least 30 points may satisfy the above-mentioned range.

Length a of Separation Membrane Main Body

The length a is a distance from one end to the other end of the separation membrane main body 2 in the second direction. When the distance is not constant, the length a can be obtained by measuring the distance at locations of 30 points or more in one separation membrane main body 2 and calculating the average.

Interval b Between Channel Materials in First Direction

The interval b between the channel materials 3 in the first direction corresponds to the width of the flow path 5. When the width of one flow path 5 is not constant in a cross-section, that is, when side surfaces of two channel materials 3 adjacent to each other are not parallel to each other, the mean value of the maximum value and the minimum value of the width of one flow path 5 is measured in a cross-section, and the average value of the mean values is calculated. When the channel material 3 shows a trapezoidal shape, in which an upper portion is narrow and a lower portion is wide, in a cross-section perpendicular to the second direction as shown in FIG. 4, first, a distance between upper portions and a distance between lower portions of the two channel materials 3 adjacent to each other are measured, and the average value thereof is calculated. The interval between the channel materials 3 is measured in the cross-sections of 30 arbitrary points or more, and the average value is calculated in each cross-section. Then, the arithmetic mean value of the average values thus obtained is further calculated, and thereby, the interval b is calculated.

The pressure loss is reduced with an increase in the interval b, but the falling of the membrane easily occurs. Conversely, the falling of the membrane hardly occurs with a decrease in the interval b, but the pressure loss is increased. In consideration of the pressure loss, the interval b is preferably 0.05 mm or more, 0.2 mm or more, or 0.3 mm or more. Further, from the viewpoint of suppressing the falling of the membrane, the interval b is preferably 5 mm or less, 3 mm or less, 2 mm or less, or 0.8 mm or less.

These upper limits and lower limits can be combined freely. For example, the interval b is preferably 0.2 mm or more and 5 mm or less, and when the interval b falls within the range, the pressure loss can be reduced while the falling of the membrane is suppressed. The interval b is more preferably 0.05 mm or more and 3 mm or less and 0.2 mm or more and 2 mm or less, and moreover preferably 0.3 mm or more and 0.8 mm or less.

Height of Channel Material c

The height c is a height difference between the channel material and the surface of the separation membrane main body. As shown in FIG. 4, the height c is a difference in height between the highest portion of the channel material 3 and the permeate-side surface of the separation membrane main body in a cross-section perpendicular to the second direction. That is, in the height, the thickness of the channel material, with which the substrate is impregnated, is not considered. The height c is a value obtained by measuring the heights of the channel materials 3 of 30 points or more and averaging the measurements. The height c of the channel material may be determined by observation of the cross-section of the channel material in the same plane, or may be determined by observation of the cross-section of the channel material in a plurality of planes.

The height c can be appropriately selected depending on the use conditions and purpose of the element, and it may be set, for example, as follows.

When the height c is larger, the flow resistance is reduced. Therefore, the height c is preferably 0.03 mm or more, 0.05 mm or more, or 0.1 mm or more. On the other hand, when the height c is smaller, the number of the membranes loaded in an element is increased. Therefore, the height c is preferably 0.8 mm or less, 0.4 mm or less, or 0.32 mm or less. These upper limits and lower limits can be combined and, for example, the height c is preferably 0.03 mm or more and 0.8 mm or less, preferably 0.05 mm or more and 0.4 mm or less, and moreover preferably 0.1 mm or more and 0.32 mm or less.

Further, the difference in height between two channel materials adjacent to each other is preferably small. When the height difference is large, since the distortion of the separation membrane occurs at the time of pressurized filtration, a defect may be generated in the separation membrane. The difference in height between two channel materials adjacent to each other is preferably 0.1 mm or less, more preferably 0.06 mm or less, and moreover preferably 0.04 mm or less.

For the same reason, a maximum height difference among all of the channel materials disposed in the separation membrane is preferably 0.25 mm or less, particularly preferably 0.1 mm or less, and moreover preferably 0.03 mm or less.

Width d of Channel Material

The width d of the channel material 3 is measured as follows. First, a mean value of the maximum value and the minimum value of the width of one flow path material 3 is calculated in a cross-section perpendicular to the first direction. That is, in the channel material 3 in which an upper portion is narrow and a lower portion is wide as shown in FIG. 4, the width of the lower portion and the width of the upper portion of the channel material are measured, and the average value thereof is calculated. The width d per membrane can be calculated by calculating such an average in the cross-sections of at least 30 points, and calculating the arithmetic mean thereof.

The width d of the channel material 3 is preferably 0.2 mm or more, or 0.3 mm or more. When the width d is 0.2 mm or more, even if pressure is applied to the channel material 3 during the operation of the separation membrane element, a shape of the channel material can be maintained and the flow path on the permeate side is formed stably. The width d is preferably 2 mm or less, or 1.5 mm or less. When the width d is 2 mm or less, the flow path on the permeate side can be adequately secured.

Since the width of the channel material is larger than the interval b between the channel materials in the second direction, pressure applied to the channel material can be dispersed.

The channel material 3 is formed such that the length thereof is larger than the width thereof. Such a long channel material 3 is referred to as a "wall-like body."

Interval e Between Channel Materials in Second Direction

The interval e between the channel materials 3 in the second direction is the shortest distance between the channel materials 3 adjacent to each other in the second direction. As shown in FIG. 2, when the channel material 3 is continuously disposed from one end to the other end of the separation membrane main body 2 in the second direction (from the inner end to the outer end in the winding direction in the separation membrane element), the interval e is 0 mm. Further, as shown in FIG. 3, when the channel material 3 is discontinuous in the second direction, the interval e is preferably 5 mm or less, more preferably 1 mm or less, and moreover preferably 0.5 mm or less. Since the interval e falls within the above-mentioned range, a mechanical load on the membrane is small even when falling of a membrane takes place, and a pressure loss due to the blockage of the flow path can be relatively small. The lower limit of the interval e is 0 mm.

Length f of Channel Material

The length f of the channel material 3 is the length of the channel material 3 in the length direction (that is, the second direction) of the separation membrane main body 2. The length f is determined by measuring the lengths of the channel materials 3 of 30 or more in one separation membrane 1, and calculating the average of the measurements. The length f of the channel material may be the length a of the separation membrane main body or less. When the length f of the channel material is equal to the length a of the separation membrane main body, this means that the channel material 3 is continuously disposed from the inner end to the outer end in the winding direction of the separation membrane 1. The length f is preferably 10 mm or more, or 20 mm or more. When the length f is 10 mm or more, a flow path is secured even under pressure.

Relation Among Dimensions a to f

As described above, the channel material of the example can be reduced in pressure loss lower than a conventional channel material having a continuous morphology such as tricot. In other words, the leaf length can be longer than that of a conventional technology even when a pressure loss is equal to that of the conventional technology. When the leaf length can be increased, the number of leaves can be reduced.

The number of leaves can be particularly reduced by setting the dimensions a to f to satisfy the following mathematical expression:

$$a^2f^2(b+c)^2(b+d)\times 10^{-6}/b^3c^3(e+f)^2 \leq 1400, \quad \text{i)}$$

$$850 \leq a \leq 7000, \quad \text{ii)}$$

$$b \leq 2, \quad \text{iii)}$$

$$c \leq 0.5, \text{ and} \quad \text{iv)}$$

$$0.15 \leq df/(b+d)(e+f) \leq 0.85. \quad \text{v)}$$

By thus arranging the channel material in a predetermined morphology on the permeate side, the pressure loss is reduced lower than a conventional channel material having a continuous morphology such as tricot, and therefore the leaf length can be longer. For this reason, it is possible to provide a separation membrane element having excellent separation performance even when the number of leaves per separation membrane element is reduced.

In addition, a millimeter (mm) can be employed for the unit of length in the above formula.

Shape

The shape of the channel material is not particularly limited, but a shape, which reduces the flow resistance in the flow path and stabilizes the flow path during permeation of the fluid, can be selected. In these points, the shape of the channel material may be in the shape of a straight column, a trapezoid, a curved column, or combinations thereof in any of cross-section perpendicular to a plane direction of the separation membrane.

When the cross-section shape of the channel material is trapezoidal, if the difference in length between an upper base and a lower base of the trapezoid is too large, the falling of the membrane at the time of pressurized filtration easily occurs at the membrane being in contact with the shorter base. For example, when the upper base of the channel material is shorter than the lower base, the width at the upper portion is larger than that at the lower portion in the flow path between the upper base and the lower base. Therefore, the upper membrane easily falls downward. Thus, to suppress such falling of the membrane, a ratio of the upper base length to the lower base length of the channel material is preferably 0.6 or more and 1.4 or less, and more preferably 0.8 or more and 1.2 or less.

The channel material may be formed to be smaller in width in the upper portion, or may be formed to be larger in width in the upper portion, or may be formed to be constant in width irrespective of the height from the separation membrane surface.

However, the upper side of a cross-section of the channel material may be rounded off in the range where the crushing of the channel material at the time of pressurized filtration is not significant.

When the channel material is made of a thermoplastic resin, the shape of the channel material can be freely adjusted to satisfy the conditions of required separation properties or permeation performance by changing a processing temperature and a type of the thermoplastic resin to be selected.

In addition, the shape of the channel material in a plane direction of the separation membrane may be linear as a whole, as shown in FIGS. 2 and 3, or may be, for example, a curved line, a sawtooth shape or a wavy line as another shape. In addition, in these shapes, the channel material may be a broken line.

In addition, the channel materials adjacent to each other may be arranged in nearly parallel with each other when the shape of the channel material in the plane direction of the separation membrane is linear. The term "arranged in nearly parallel" comprehends, for example, that the channel materials do not cross one another on the separation membrane, that the angle between the longitudinal directions of two channel materials adjacent to each other is 0° or more and 30° or less, that the above-mentioned angle is 0° or more and 15° or less, and that the above-mentioned angle is 0° or more and 5° or less.

In addition, the angle which is formed by the longitudinal direction of the channel material and the axial direction of the water collection tube is preferably 60° or more and 120° or less, more preferably 75° or more and 105° or less, and moreover preferably 85° or more and 95° or less. When the angle which is formed by the longitudinal direction of the channel material and the axial direction of the water collection tube is within the above-mentioned range, the permeate water can be efficiently collected in the water collection tube.

It is preferred to suppress falling of the separation membrane main body at the time when the separation membrane main body is pressurized in the separation membrane element to form the flow path stably. To suppress falling, it is preferred that an area of contact between the separation membrane main body and the channel material is large, that is, that the area of the channel material is large relative to the area of the separation membrane main body (an projected area to the membrane surface of the separation membrane main body). On the other hand, to reduce the pressure loss, it is preferred that a cross-sectional area of the flow path is large. To secure a large cross-sectional area of the flow path while a large contact area, which is perpendicular to the cross-section of the flow path in the longitudinal direction of the flow path, is secured between the separation membrane main body and the flow path, the cross-section shape of the flow path is preferably in the form of a concave lens. Further, the channel material 3 may be in the shape of a straight column which does not change in width in the cross-section shape in a direction perpendicular to the winding direction. Further, the channel material 3 may be a trapezoidal wall-like body which changes in width in the cross-section shape in a direction perpendicular to the winding direction, or may be a shape such as an elliptic column, an elliptic cone, a quadrangular pyramid or a hemisphere as long as the shape does not affect the separation membrane performance.

The shape of the channel material is not limited to the shapes shown in FIGS. 1 to 3. When the channel material is arranged by affixing a melted material, like a hot-melt method, to the permeate-side surface of the separation membrane main body, the shape of the channel material can be freely adjusted to satisfy the conditions of required separation properties or permeation performance by changing a processing temperature and a type of a resin for hot-melt to be selected.

In FIGS. 1 to 3, a planar shape of the channel material 3 is linear in the length direction. However, the channel material 3 can be modified to another shape as long as the channel material 3 is convex relative to the surface of the separation membrane main body 2, and a desired effect as a separation membrane element is not impaired. That is, the shape in the plane direction of the channel material may be in the form of a curve line, a wavy line, and the like. Further, a plurality of channel materials contained in one separation membrane may be formed such that at least one of the width and the length is different from one another.

Projected Area Ratio

A projected area ratio of the channel material to the permeate-side surface of the separation membrane is preferably 0.03 or more and 0.85 or less, more preferably 0.15 or more and 0.85 or less, moreover preferably 0.2 or more and 0.75 or less, and particularly preferably 0.3 or more and 0.6 or less particularly from the viewpoint of reducing the flow resistance in the flow path on the permeate side and forming the flow path stably. In addition, the projected area ratio is a value obtained by dividing a projected area of the channel material obtained when the separation membrane is cut out to the size of 5 cm×5 cm and the cut out piece is projected to a plane parallel to a face direction of the separation membrane by the cut out area (25 cm$^2$). Further, this value can also be expressed by the above-mentioned formula df/(b+d)(e+f).

Defect Rate

Water having permeated the separation membrane passes through the flow path 5 on the permeate side and is collected in the water collection tube 6. Water, which has permeated a region away from the water collection tube, namely, a region near the outer end in the winding direction (region close to an end on right side in FIG. 5) in the separation membrane, joins water having permeated a region on an inner side than the above region in the winding direction during flowing toward the water collection tube 6, and flows toward the water collection tube 6. Accordingly, in the flow path on the permeate side, the amount of water present in a portion away from the water collection tube 6 is small.

Therefore, even when the channel material on the permeate side is not present in the region near the outer end in the winding direction and the flow resistance in the region is high, the influence on the amount of water produced of the whole separation membrane element is little. For the same reason, the influence on the amount of water produced of the separation membrane element is little even when, in the region near the outer end in the winding direction, formation accuracy of the channel material is low and a resin for forming the channel material is continuously applied in the first direction. In the region, the same is true in the case where the resin is applied without a space in the face direction (x-y plane) of the separation membrane main body.

Therefore, when a region disposed at the outer end in the winding direction of the separation membrane main body 2, in which the channel material on the permeate side is not formed or the channel material on the permeate side is arranged such that the channel material is continuous in the first direction (the channel material on the permeate side is disposed without intervals in the first direction), is denoted by R3, a proportion of the length L3 of the region R3 to the length L1 (corresponding "a" described above) of the whole separation membrane leaf may be 0%, and is preferably 30% or less, more preferably 10% or less, and particularly preferably 3% or less. This proportion is referred to as a defect rate. The defect rate is represented by (L3/L1)×100 in FIG. 6.

Figure 6:
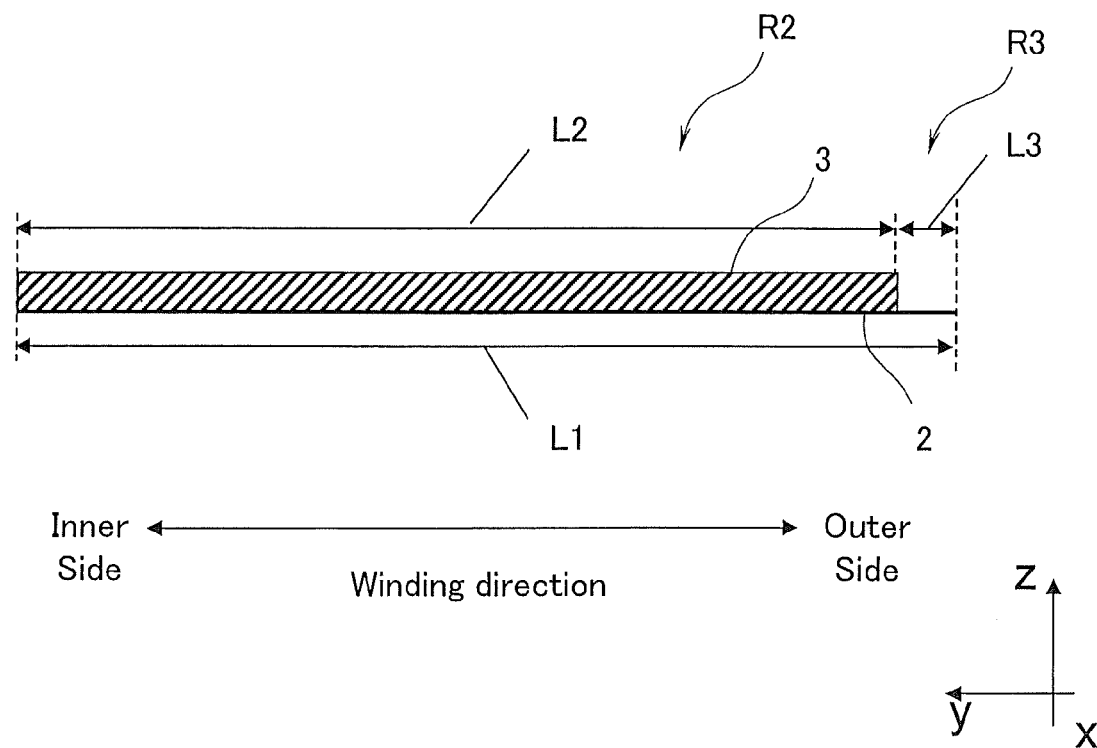
FIG. 6 is a schematic side elevation view of the separation membrane.

In FIG. 6, since the channel material is not disposed in the region R3, the L3 represents a distance from the outer end in the winding direction of the separation membrane main body 2 to the outer end in the winding direction of the channel material 3 on the permeate side.

2. Separation Membrane Element (2-1) Overview

As shown in FIG. 4, the separation membrane element 100 includes the water collection tube 6, and the separation membrane 1 having any of the constitutions described above and wound around the water collection tube 6. Further, the separation membrane element 100 further includes members such as end plates (not shown).

(2-2) Separation Membrane

Overview

The separation membrane 1 is wound around the water collection tube 6 and arranged such that the width direction of the separation membrane 1 is along the axial direction of the water collection tube 6. Consequently, the separation membrane 1 is arranged such that a length direction is along the winding direction.

Therefore, the channel material 3, a wall-like body, is discontinuously disposed at least along the axial direction of the water collection tube 6 on the permeate-side surface 22 of the separation membrane 1. That is, the flow path 5 is formed to be continuous from the outer end to the inner end of the separation membrane in the winding direction. Consequently, permeate water easily reaches a central pipe, or the flow resistance is reduced, and therefore a large amount of water produced is obtained.

The "inner side in the winding direction" and the "outer side in the winding direction" are as shown in FIG. 5. That is, the "inner end in the winding direction" and the "outer end in the winding direction" correspond to an end close to the water collection tube 6 in the separation membrane 1 and an end away from the water collection tube 6 in the separation membrane 1, respectively.

As described above, the channel material does not need to reach an edge of the separation membrane, the channel material may not be disposed, for example, at the outer end of an envelope-like membrane in the winding direction and at an end of an envelope-like membrane in the axial direction of the water collection tube.

Membrane Leaf and Envelope-Like Membrane

As shown in FIG. 1, the separation membrane constitutes a membrane leaf 4 (may be referred to simply as "leaf" herein). The separation membrane 1 is arranged to oppose the feed-side surface 21 thereof to a feed-side surface 71 of another separation membrane 7 across a channel material on the feed side not shown in the leaf 4. In the separation membrane leaf 4, the channel material on the feed side is formed between the feed-side surfaces of the separation membranes, which faces each other.

By further overlaying the two membrane leaves 4, the separation membrane 1 forms an envelope-like membrane with the separation membrane 7 of the other membrane leaf, which is opposed to the permeate-side surface 22 of the separation membrane 1. In the envelope-like membrane, a space between the permeate-side surfaces facing each other is opened at only one inner side in the winding direction in a rectangular shape of the separation membrane, and sealed at other three sides to flow the permeate water into the water collection tube 6. The permeate water is isolated from the feed water by the envelope-like membrane.

Examples of the sealing include a morphology of adhesion using an adhesive, hot-melt or the like; a morphology of melt adhesion by heating, laser or the like; and a morphology of sandwiching of a sheet made from rubber. The sealing by adhesion is particularly preferred since it is the most convenient and has a large effect.

Further, the inner end in the winding direction is closed by folding or sealing at the feed-side surface of the separation membrane. When the feed-side surface of the separation membrane is not folded but sealed, distortion at the end of the separation membrane is hardly generated. By suppressing the generation of the deflection near a crease, it is possible to suppress spaces generated between separation membranes in winding the separation membrane, and the occurrence of leakage due to the spaces.

By thus suppressing the occurrence of the leakage, the recovery rate of the envelope-like membrane is improved. The recovery rate of the envelope-like membrane is determined by the following procedure. That is, an air leakage test of the separation membrane element is conducted in water, and the number of the envelope-like membranes with the leakage is counted. A ratio (number of envelope-like membranes with air leakage)/(number of envelope-like membranes subjected to evaluation) is calculated as the recovery rate of the envelope-like membrane based on the results of counting.

The specific procedure of the air leakage test is as follows. One end of a central tube of the separation membrane element is sealed, and air is introduced from the other end. The introduced air passes through the holes of the water collection tube and reaches the permeate side of the separation membrane. However, when the distortion of the separation membrane is generated near the crease due to the insufficient folding of the separation membrane and, hence, spaces are present near the crease as described above, the air moves through such spaces. As a consequence, the air moves to the feed side of the separation membrane, and the air reaches the water from the end (feed side) of the separation membrane element. In this way, the air leakage can be checked as the generation of air bubbles.

When the separation membrane leaf is formed by folding, the longer the leaf is (that is, the longer the original separation membrane is), the longer a time required to fold the separation membrane is. However, by sealing the feed-side surface of the separation membrane not by folding, an increase in production time can be suppressed even when the leaf is long.

In addition, in the separation membrane leaf and the envelope-like membrane, the separation membranes (separation membranes 1 and 7 in FIG. 1) opposed to each other may have the same constitution, or may have a different constitution. That is, in the separation membrane element, since it may be sufficient to dispose the above-mentioned channel material on the permeate side on at least one of two permeate-side surfaces opposed to each other, the separation membrane provided with the channel material on the permeate side and the separation membrane not provided with the channel material on the permeate side may be alternately overlaid. However, for convenience of description, in the separation membrane element and descriptions concerning the separation membrane element, the "separation membrane" includes a separation membrane not provided with the channel material on the permeate side (for example, a membrane having the same constitution as in the separation membrane main body).

The separation membranes opposed to each other at the permeate-side surface or feed-side surface may be two different membranes or may be one membrane folded.

(2-3) Flow Path on Permeate Side

As described above, the separation membrane 1 includes the channel material 3 on the permeate side. The flow path on the permeate side is formed on the inner side of the envelope-like membrane, that is, between the permeate-side surfaces of the separation membranes opposed to each other, by the channel material 3 on the permeate side.

(2-4) Flow Path on Feed Side
Channel Material

The separation membrane element 100 includes a channel material (not shown), in which a projected area ratio thereof to the separation membrane 1 is more than 0 and less than 1, between the feed-side surfaces of the overlaid separation membranes. A projected area ratio of the channel material on the feed side to the separation membrane 1 is preferably 0.03 or more and 0.50 or less, more preferably 0.10 or more and 0.40 or less, and particularly preferably 0.15 or more and 0.35 or less. Since the projected area ratio is 0.03 or more and 0.50 or less, the flow resistance can be relatively kept low. In addition, the projected area ratio is a value obtained by dividing a projected area of the channel material on the feed side obtained when the separation membrane and the channel material on the feed side are cut out to the size of 5 cm×5 cm and the cut out channel material on the feed side is projected to a plane parallel to a face direction of the separation membrane by the cut out area.

The height of the channel material on the feed side is preferably more than 0.5 mm and 2.0 mm or less, and more preferably 0.6 mm or more and 1.0 mm or less in consideration of the balance between various performances and the operation cost as described later.

The shape of the channel material on the feed side is not particularly limited, and it may have a continuous morphology, or may have a discontinuous morphology. Examples of the channel material having a continuous morphology include members such as a film and a net. The term "continuous morphology" used herein means that the channel material is substantially continuous through the length of the channel material. The continuous morphology may include some locations where parts of the channel material are discontinuous to the extent not causing disadvantage such as a decrease in the amount of water produced. Further, the definition of "discontinuous" is as is described concerning the channel material on the permeate side. In addition, a raw material of the channel material on the feed side is not particularly limited, and it may be a material which is the same as or different from that of the separation membrane.

Processing of Projections and Depressions

Further, it is possible to provide the height difference for the feed side of the separation membrane by using methods such as embossing, isostatic pressing, and calendering in place of disposing the channel material on the feed side on the separation membrane feed-side.

Examples of the embossing method include roll embossing and the like. The pressure and the temperature used in the roll embossing can be adequately determined depending on the melting point of the separation membrane. For example, when the separation membrane has a porous support layer containing an epoxy resin, the embossing is preferably performed at a linear pressure of 10 kg/cm or more and 60 kg/cm or less, and at a heating temperature of 40° C. or more and 150° C. or less. When the separation membrane has a porous support layer containing a heat resistant resin such as polysulfone, the embossing is preferably performed at a linear pressure of 10 kg/cm or more and 70 kg/cm or less, and at a roll heating temperature of 70° C. or more and 160° C. or less. In the case of roll embossing, the embossed separation membrane is preferably taken up at a speed of 1 m/minute or more and 20 m/minute or less in any case.

In the case of embossing, the shape of the pattern provided on the roll is not particularly limited, but it is important to reduce the flow resistance in the flow path and stabilize the flow path during supplying of the fluid to the separation membrane element and permeation of the fluid. In view of these points, examples of the shape of the pattern observed from above the surface of the separation membrane include oval, circle, ellipse, trapezoid, triangle, rectangle, square, parallelogram, rhombus, and indeterminate forms, and three dimensionally, the shape observed from above the surface may have a cross-sectional size the same, or reducing or increasing with height.

The height difference of the feed-side surface of the separation membrane, which can be provided by embossing, can be freely adjusted by changing the pressure and heating conditions such that separation properties and water permeation performance satisfy the required conditions. However, when the height difference of the feed-side surface of the separation membrane is too large, the number of the membrane leaves, which can be loaded in a vessel in forming into a separation membrane element, is reduced despite a decrease in the flow resistance. When the height difference is small, the flow resistance in the flow path is increased, and the separation properties and water permeation performance are deteriorated. Therefore, the water production capability of the element is deteriorated, and hence, the operation cost for increasing the amount of the water produced is increased.

Accordingly, in the separation membrane, the height difference of the feed-side surface of the separation membrane is preferably more than 0.5 mm and 2.0 mm or less, and more preferably 0.6 mm or more and 1.0 mm or less in consideration of the balance between various performances and the operation cost as described above.

The height difference of the feed-side surface of the separation membrane can be determined by the same technique as in the height difference of the permeate side of the separation membrane described above.

The width of the groove is preferably 0.2 mm or more and 10 mm or less, and more preferably 0.5 mm or more and 3 mm or less.

It is preferred to appropriately design a pitch to be one-tenth or more and fifty times or less of the width of the groove. The width of the groove is the width of the depression in the surface having the height difference, and the pitch of the groove is the horizontal distance between the highest point of the surface having the height difference to the highest point of the adjacent high area.

A projected area ratio of a portion which becomes convex by embossing is preferably 0.03 or more and 0.5 or less, more preferably 0.10 or more and 0.40 or less, and particularly preferably 0.15 or more and 0.35 or less for the same reason as in the channel material on the feed side.

The "height difference" in the surface of the separation membrane is a height difference between the surface of the separation membrane main body and the apex of the channel material (namely, the height of the channel material) when the channel material formed of a different material is disposed, and a height difference between projection and depression when the separation membrane is provided with projections and depressions.

(2-5) Water Collection Tube

The water collection tube 6 may be configured such that the permeate water flows through the tube, and a material, a shape, a size thereof and the like are not particularly limited. As the water collection tube 6, for example, a cylindrical member having a side surface provided with a plurality of holes is used.

3. Method of Producing Separation Membrane Element (3-1) Production of Separation Membrane Main Body The method of producing the separation membrane main body is described above, and its summary is as follows.

A resin is dissolved in a good solvent, the resulting resin solution is cast on a substrate and immersed in pure water to combine a porous support layer with the substrate. Thereafter, as described above, a separation functional layer is formed on the porous support layer. Moreover, as required, the separation functional layer is subjected to a chemical treatment by chlorine, acid, alkali, nitrous acid or the like to improve separation performance and permeation performance, and then the separation functional layer is washed for the removal of the monomer and the like to prepare a continuous sheet of the separation membrane main body.

In addition, projections and depressions may be formed on the separation membrane main body by embossing before or after the chemical treatment.

(3-2) Arrangement of Channel Material on Permeate Side

The method of producing the separation membrane includes the step of disposing a discontinuous channel material on the permeate-side surface of the separation membrane main body. This step may be conducted at any time of separation membrane production. For example, the channel material may be disposed before forming the porous support layer on the substrate, or may be disposed before forming the separation functional layer after disposing the porous support layer, or may be disposed before or after the chemical treatment after forming the separation functional layer.

A method of arranging the channel material includes, for example, the step of arranging a soft material on the separation membrane, and the step of curing the material. Specifically, ultraviolet-curable resins, chemical polymerization, hot-melt, drying and the like are used for arranging the channel material. Particularly, hot-melt is preferably used, and specifically, this process includes the step of softening materials such as resins by heat (namely, thermally melting), the step of arranging the softened material on the separation membrane, and the step of affixing the material onto the separation membrane by curing through cooling.

Examples of the method of arranging the channel material include application, printing, spraying, and the like. Examples of equipment used for arranging the channel material include hot-melt applicators of a nozzle type, hot-melt applicators of a spray type, hot-melt applicators of a flat nozzle type, roll coaters, extrusion type coaters, printing machines, sprayers and the like.

(3-3) Formation of Flow Path on Feed Side

When the channel material on the feed side is a discontinuous member formed of a material different from the separation membrane main body, the same method and timing as in the formation of the channel material on the permeate side can be applied to the formation of the channel material on the feed side.

Further, it is also possible to provide the height difference for the feed side of the separation membrane by using the method such as embossing, isostatic pressing, and calendering rather than the formation of the channel material on the feed side by using a material different from the separation membrane main body.

Examples of the embossing method include roll embossing and the like. The pressure and the temperature used in the roll embossing can be adequately determined depending on the melting point of the separation membrane. For example, when the separation membrane has a porous support layer containing an epoxy resin, the embossing is preferably performed at a linear pressure of 10 kg/cm or more and 60 kg/cm or less, and at a heating temperature of 40° C. or more and 150° C. or less. When the separation membrane has a porous support layer containing a heat resistant resin such as polysulfone, the embossing is preferably performed at a linear pressure of 10 kg/cm or more and 70 kg/cm or less, and at a roll heating temperature of 70° C. or more and 160° C. or less. In the case of roll embossing, the embossed separation membrane is preferably taken up at a speed of 1 m/minute or more and 20 m/minute or less in any case.

In the case of embossing, the shape of the pattern provided on the roll is not particularly limited, but it is important to reduce the pressure loss in the flow path and stabilize the flow path during supplying of the fluid to the separation membrane element and permeation of the fluid. In view of these points, in the shape of the pattern observed from above the surface of the separation membrane, oval, circle, ellipse, trapezoid, triangle, rectangle, square, parallelogram, rhombus, and indeterminate forms are employed. Further, three dimensionally, the pattern may be formed such that the higher the height of a portion of the pattern is, the smaller the width of the pattern is, or may be formed such that the higher the height of a portion of the pattern is, the larger the width of the pattern is, or may be formed such that the width of the patter is constant regardless of the height of the pattern.

The height difference of the feed-side surface of the separation membrane, which can be provided by embossing, can be freely adjusted by changing the pressure and heating conditions such that separation properties and water permeation performance satisfy the required conditions.

In addition, as described above, when the flow path on the feed side is formed by affixing the channel material on the feed side to the separation membrane main body, or by providing the separation membrane with projections and depressions, these steps of forming the flow path on the feed side may be regarded as one step in the method for producing the separation membrane.

When the flow path on the feed side is a member continuously formed such as a net, the flow path on the feed side may be formed by arranging the channel material on the permeate side on the separation membrane main body to produce a separation membrane, and then overlaying the channel material on the feed side on the separation membrane.

(3-4) Formation of Separation Membrane Leaf

As described above, the separation membrane leaf may be formed by folding the separation membrane so that the feed-side surface faces inward, or may be formed by bonding the two separate separation membranes to each other.

A method of producing the separation membrane element preferably includes the step of sealing an inner end in the winding direction of the separation membrane at the feed-side surface. In the step of sealing, two separation membranes are overlaid on each other such that the feed-side surfaces thereof are opposed to each other. Further, the inner ends of the overlaid separation membranes in the winding direction, that is, left-hand ends in FIG. 5, are sealed.

Examples of a method of "sealing" include adhesion using an adhesive, hot-melt or the like; melt adhesion using heating, laser or the like; and sandwiching of a sheet made from rubber. The sealing by adhesion is particularly preferred since it is the most convenient and has a large effect.

At this time, a channel material on the feed side, which is formed separately from the separation membrane, may be disposed on the inner side of the overlaid separation membranes. By previously providing the height difference on the feed-side surface of the separation membrane by embossing or resin application as described above, arrangement of the channel material on the feed side can be omitted.

Either sealing of the feed-side surface or sealing of the permeate-side surface (formation of the envelope-like membrane) may be performed first, or sealing of the feed-side surface and sealing of the permeate-side surface may be performed in parallel while overlaying the separation membranes. However, to suppress the occurrence of wrinkles in the separation membrane during winding, it is preferred to complete the solidification of an adhesive or hot-melt at an end in a width direction, that is, the solidification for forming the envelope-like membrane, after the completion of winding to allow the possibility that the separation membranes adjacent to each other deviate from each other in a length direction by winding.

(3-5) Formation of Envelope-Like Membrane

An envelope-like membrane can be formed by folding a separation membrane so that the permeate-side surface faces inward, and bonding the permeate-side surfaces to each other, or by overlaying two separation membranes so that the permeate-side surfaces face inward, and bonding the permeate-side surfaces to each other. In the rectangular envelope-like membrane, to open only one end in the length direction, other three sides are sealed. Sealing can be carried out by an adhesive, adhesion by hot-melt or the like, or melt adhesion by heating or laser.

The adhesive used for the formation of the envelope-like membrane preferably has a viscosity of 40 PS or more and 150 PS or less, and more preferably 50 PS or more and 120 PS or less. When the viscosity of the adhesive is too high, wrinkles easily occur when a laminated leaf is wound around the water collection tube. The wrinkle may impair performance of the separation membrane element. On the other hand, when the viscosity of the adhesive is too low, the adhesive flows out of the end of the leaf to contaminate the apparatus. Further, when the adhesive adheres to a portion other than a portion for adhesion, performance of the separation membrane element is impaired, and operation efficiency is significantly decreased due to operation for treating the adhesive flown out.

The amount of the adhesive to be applied is preferably such an amount that the width of an area to which the adhesive is applied is 10 mm or more and 100 mm or less after winding the leaf around the water collection tube. This allows the separation membrane to adhere with certainty, flow of the raw fluid into the permeate side is suppressed. A relatively large effective membrane area can be secured.

As the adhesive, an urethane-based adhesive is preferable, and an adhesive prepared by mixing isocyanate as the main component and a polyol as a curing agent at a ratio of the isocyanate to the polyol of 1:1 to 1:5 is preferable to adjust the viscosity to the range of 40 PS or more and 150 PS or less. The viscosity of the adhesive may be determined by preliminarily measuring the viscosity of the main component, the curing agent monomer, and the mixture at a predetermined blend ratio by using Type B viscometer (JIS K 6833).

(3-6) Winding of Separation Membrane

A conventional element manufacturing apparatus can be employed for producing the separation membrane element. As a method of preparing the element, the methods described in reference literatures (JP 44-014216 B, JP 04-011928 A, JP 11-226366 A) can be used. The detail is as follows.

When the separation membrane is wound around the water collection tube, the separation membrane is arranged such that a closed end of the leaf, namely, a closed portion of the envelope-like membrane, faces the water collection tube. By winding the separation membrane around the water collection tube in this arrangement, the separation membrane is spirally wound.

When a spacer such as tricot or a substrate is wound around the water collection tube, the adhesive applied to the water collection tube is hardly fluidized at the time of winding the element, this leads to suppressing of leakage, and furthermore the flow path around the water collection tube is secured stably. In addition, the spacer may be wound longer than the perimeter of the water collection tube.

When tricot is wound around the water collection tube, the adhesive applied to the water collection tube is hardly fluidized at the time of winding the element, this leads to suppressing of leakage, and furthermore the flow path around the water collection tube is secured stably. In addition, the tricot may be wound longer than the perimeter of the water collection tube.

(3-7) Other Steps

The method of producing the separation membrane element may include winding a film, a filament and the like further around the outside of a wound body of the separation membrane formed as described above, or may include additional steps such as cutting the edges in which the edges of the separation membrane in the axial direction of the water collection tube are cut and aligned, attaching the end plates to the edges, and the like.

4. Use of Separation Membrane Element

The separation membrane element may be processed for use as a separation membrane module through further connecting two or more separation membrane elements in series or parallel and accommodating in a pressure vessel.

The separation membrane element, module, can be used to constitute a fluid separation apparatus by combining with, for example, a pump for the fluid supply, or an apparatus which conducts pretreatment of the fluid. By using such fluid separation apparatus, for example, feed water can be separated into the permeate fluid such as permeate water and concentrate water which did not permeate the separation membrane to obtain the desired permeate water.

The operation pressure used in the permeation of water to be treated through the membrane module is preferably 0.2 MPa or more and 5 MPa or less considering that though a removal rate of the components is improved with the increase of the operation pressure of the fluid separation apparatus, the energy required for the operation also increases with the pressure, and considering the retention of the feed channel and permeate channel of the separation membrane element. The temperature of the feed water is preferably 5° C. or more and 45° C. or less since excessively high temperature results in the reduced desalination rate and the lower temperature causes the flux of membrane permeation to decrease. When the pH of the feed water is in a neutral range, the production of scale of magnesium or the like is suppressed and membrane deterioration is also suppressed even when the feed water is fluid with high salt concentration such as sea water.

The fluid treated by the separation membrane element is not particularly limited, and examples of the feed water to be used for water treatment include a liquid mixture containing 500 mg/L or more and 100 g/L or less of TDS (total dissolved solids) such as sea water, brackish water, and exhaust water. TDS generally refers to the total content of the dissolved solid content and is represented by the unit of (weight/volume), but it may be represented by "weight ratio" when 1 L is regarded as 1 kg. TDS is calculated, by definition, from the weight of the residue when the solution filtered through a 0.45 μm filter is evaporated at a temperature of 39.5° C. to 40.5° C. However, for more convenience, TDS is calculated by conversion from practical salinity (S).

EXAMPLES

Hereinafter, our membranes, elements and methods will be further described by referring to the Examples. However, this disclosure is by no means limited by these Examples.
Height Difference on Permeate Side of Separation Membrane An average height difference was analyzed from measurements of the permeate side of the separation membrane cut to the size of 5 cm×5 cm using high precision shape measurement system KS-1100 manufactured by KEYENCE Corporation. The average was calculated by measuring 30 points with at least 10 µm height difference, summing the height measured, and dividing the sum by the number of points measured.
Pitch and Interval of Channel Material on Permeate Side Thirty arbitrary cross-sections of the channel material were photographed at a magnification of 500 times by using a scanning electron microscope (Model S-800) (manufactured by HITACHI LTD.), and a horizontal distance between an apex of the channel material on the permeate side of the separation membrane and an apex of a neighboring channel material was measured at 200 locations, and an average value calculated from the measurements was taken as a pitch.

The interval b was measured by the method described above in the photos used for measuring the pitch.
Projected Area Ratio of Channel Material The separation membrane was cut out to the size of 5 cm×5 cm together with the channel material, and the entire projected area of the channel material was measured by using a laser microscope (a magnification was selected from 10 times to 500 times) and moving a stage of the microscope. A value obtained by dividing a projected area obtained when the channel material was projected from the permeate side or feed side of the separation membrane by the cut out area was taken as a projected area ratio.
Amount of Water Produced The separation membrane or the separation membrane element was operated for 100 hours under the conditions of an operation pressure of 2.5 MPa, an operation temperature of 25° C. and a recovery rate of 15% using a saline solution having a concentration of 500 mg/L and a pH of 6.5 as feed water. Thereafter, the separation membrane or the separation membrane element was operated for 10 minutes under the same conditions, and thereby permeate water was obtained. The amount of permeate water (cubic meter) permeated per unit area of the separation membrane and per day was determined from the volume of the permeate water obtained in the 10-minutes operation, and taken as the amount of water produced ($m^3$/day).
Desalination Rate (Removal Rate of TDS)

On the feed water, which was used in the 10-minutes operation in measurement of the amount of water produced and the permeate water sampled, a TDS concentration was determined from measurement of conductance, and the removal rate of TDS was calculated by the following formula:

Removal rate of TDS (%)=100×{1−(TDS concentration of the permeate water/TDS concentration of the feed water)}.

Defect Rate

For all the wall-like bodies, the membrane leaf length L1 and the distance L3 of a region where the wall-like body did not exist or the channel material was applied over the surface from an end away from the water collection tube were measured, and the calculation based on the formula, defect rate (%)=L3/L1×100, was conducted to determine an average value per wall-like body. Hereinafter, the determined average is called as "defect rate."
Temporal Change Rate The temporal change rate is a rate of change in amounts of water produced between after a lapse of 1 hour and after a lapse of 500 hours from the start of operation and can be expressed by 100−(amount of water produced after 500 hours)/(amount of water produced after 1 hour)×100, and a separation membrane element in which the numerical value thereof is closer to 0 is a separation membrane element in which changes in the amount of water produced are small.

Example 1

On a nonwoven fabric including polyethylene terephthalate fiber (fiber diameter: 1 decitex, thickness: 90 µm, air permeability: 0.9 cc/$cm^2$/sec) produced by a papermaking method, a 15.0% by weight DMF solution of polysulfone was cast at a thickness of 180 µm at room temperature (25° C.). Immediately after casting, the fabric was immersed in pure water and left for 5 minutes, and was immersed in hot water of 80° C. for 1 minute to prepare a roll of porous support layer (thickness 130 µm) including a fiber-reinforced polysulfone support membrane.

Thereafter, the porous support layer roll was wound back, and an aqueous solution of 1.8% by weight m-PDA and 4.5% by weight ε-caprolactam was applied onto the polysulfone surface. After blowing nitrogen on the surface from an air nozzle to remove an excessive aqueous solution from the support membrane surface, a n-decane solution at 25° C. containing 0.06% by weight trimesic chloride was applied to fully wet the surface. Thereafter, an excessive solution was removed from the membrane by blowing air, and the membrane was washed with hot water at 80° C., and liquid on the membrane was blown off by blowing air to obtain a separation membrane roll.

Then, ethylene vinyl acetate-based Hot Melt 701A (produced by TEX YEAR INDUSTRIES INC.) was linearly applied under the conditions of a resin temperature of 125° C. and a running speed of 3 m/min so that the applied Hot Melt was perpendicular to the axial direction of the water collection tube in forming a separation membrane element, and the applied Hot Melt was perpendicular to the axial direction of the water collection tube from the inner end to the outer end in a winding direction in forming an envelope-like membrane by use of an applicator equipped with a comb-shaped shim having a slit width of 0.5 mm and a pitch of 0.9 mm while regulating the temperature of a backup roll at 20° C. to affix the resulting channel material which had a height of 0.26 mm, a width of 0.5 mm, an angle of 90° which was formed by the channel material and the axial direction of the water collection tube, a interval between channel materials of 0.4 mm in the first direction, a pitch of 0.9 mm, a projected area ratio of 0.55 and a defect rate of 0% to the whole area of the separation membrane.

A difference in height between the channel materials adjacent to each other was 30 mm or less.

The separation membrane was cut into a piece with a size of 43 $cm^2$, and the cut separation membrane was placed in a pressure vessel, and the operation was conducted under the conditions described above to obtain permeate water, and consequently the amount of the water produced and the desalination rate were respectively 1.03 $m^3$/$m^2$/day and 98.3%.

The conditions and evaluation results of Examples and Comparative Examples are shown in Table 1 to Table 4.

Example 2

The separation membrane roll obtained in Example 1 was folded and cut so that an effective area in the separation membrane element was 37.0 m², and a net (thickness: 0.7 mm, pitch: 5 mm×5 mm, fiber diameter: 350 µm, projected area ratio: 0.13) was used for the channel material on the feed side to prepare 26 leaves with a width of 900 mm and a leaf length of 800 mm.

The leaf thus obtained was spirally wound around a water collection tube (width: 1020 mm, diameter: 30 mm, number of holes of 40× one row in a linear arrangement) made of ABS, and a film was wound on the outer circumference of the resulting wound body. The film was secured by a tape, and then after cutting the edges, the end plates were fitted on the edges and filament winding was conducted to prepare an 8-inch element.

The resulting element was placed in a pressure vessel, and the operation was conducted under the conditions described above to obtain permeate water, and consequently the amount of the water produced and the desalination rate were respectively 35.8 m³/day and 98.2%, and the temporal change rate was 4.6%.

Example 3

A separation membrane roll was prepared in the same manner as in Example 1 except that a channel material was formed as a wall-like body which was discontinuous in a second direction as shown in FIG. 3. An interval ("e" in FIG. 3) between the channel materials in the second direction was 0.3 mm, and the number of intervals in the second direction was 10. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 36.0 m³/day and 98.0%, and the temporal change rate was 4.7%.

Example 4

A separation membrane roll was prepared in the same manner as in Example 1 except that a channel material was formed as a wall-like body which was discontinuous in a second direction as shown in FIG. 3. An interval ("e" in FIG. 3) between the channel materials in the second direction was 1 mm, and the number of intervals in the second direction was 10. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 36.7 m³/day and 98.2%, and the temporal change rate was 97.1%.

Example 5

A separation membrane roll was prepared in the same manner as in Example 1 except that the defect rate was 12%. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 36.1 m³/day and 97.5%, and the temporal change rate was 4.9%.

Example 6

A separation membrane roll was prepared in the same manner as in Example 1 except that the defect rate was 25%. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 28.9 m³/day and 98.2%, and the temporal change rate was 4.6%.

Example 7

A separation membrane roll was prepared in the same manner as in Example 1 except that in the second direction of the wall-like body, discontinuous locations of 0.3 mm were present per membrane leaf and the defect rate was 12%. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 28.7 m³/day and 98.2%, and the temporal change rate was 4.6%.

Example 8

A separation membrane roll was prepared in the same manner as in Example 1 except that the angle which was formed by the channel material and the axial direction of the water collection tube was changed to 80°. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 34.7 m³/day and 98.3%, and the temporal change rate was 4.6%.

Example 9

A separation membrane roll was prepared in the same manner as in Example 1 except that the angle which was formed by the channel material and the axial direction of the water collection tube was changed to 80°. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 34.3 m³/day and 98.3%, and the temporal change rate was 4.7%.

Example 10

A separation membrane roll was prepared in the same manner as in Example 1 except that the angle which was formed by the channel material and the axial direction of the water collection tube was changed to 65°. Subsequently, a separation membrane element was prepared in the same manner as in Example 2.

The element was placed in a pressure vessel, and the operation was conducted under the conditions described above to obtain permeate water, and consequently the amount of the water produced and the desalination rate were respectively 34.8 m$^3$/day and 98.3%, and the temporal change rate was 4.6%.

Example 11

A separation membrane element was prepared in the same manner as in Example 2 except that the net was not disposed on the feed side, and the separation membrane was subjected to embossing (embossing temperature 130° C., linear pressure 60 kgf/cm, height 350 μm, pitch 5 mm, projected area ratio 0.13).

The element was placed in a pressure vessel, and the operation was conducted under the conditions described above to obtain permeate water, and consequently the amount of the water produced and the desalination rate were respectively 36.0 m$^3$/day and 97.6%, and the temporal change rate was 5.9%.

Example 12

A separation membrane element was prepared in the same manner as in Example 2 except that the height of the wall-like body was 0.32 mm, and the effective membrane area was 36 m$^2$.

The element was placed in a pressure vessel, and the operation was conducted under the conditions described above to obtain permeate water, and consequently the amount of the water produced and the desalination rate were respectively 25.6 m$^3$/day and 98.4%, and the temporal change rate was 4.2%.

Example 13

A separation membrane element was prepared in the same manner as in Example 2 except that the thickness of the net was 0.85 mm, and the effective membrane area was 34 m$^2$.

The element was placed in a pressure vessel, and the operation was conducted under the conditions described above to obtain permeate water, and consequently the amount of the water produced and the desalination rate were respectively 32.1 m$^3$/day and 98.6%, and the temporal change rate was 4.6%.

Example 14

A separation membrane element was prepared in the same manner as in Example 2 except that the thickness of the net was 0.95 mm, and the effective membrane area was 31 m$^2$.

The element was placed in a pressure vessel, and the operation was conducted under the conditions described above to obtain permeate water, and consequently the amount of the water produced and the desalination rate were respectively 28.5 m$^3$/day and 98.7%, and the temporal change rate was 4.5%.

Example 15

The separation membrane roll provided with the wall-like body affixed, which was obtained in Example 1, was folded and cut so that an effective area in the separation membrane element was 0.5 m$^2$, and a net (thickness: 510 μm, pitch: 2 mm×2 mm, fiber diameter: 255 μm, projected area ratio: 0.21) was used for the channel material on the feed side to prepare two leaves with a width of 200 mm.

Thereafter, a separation membrane element, around which two leaves were spirally wound while winding around a water collection tube (width: 300 mm, outer diameter: 17 mm, number of holes of 8× two rows in a linear arrangement) made of ABS, was prepared, and a film was wound on the outer circumference of the resulting wound body. The film was secured by a tape, and then after cutting the edges, the end plates were fitted on the edges and filament winding was conducted to prepare a 2-inch element.

The element was placed in a pressure vessel, and the operation was conducted under the conditions described above to obtain permeate water, and consequently the amount of the water produced and the desalination rate were respectively 0.241 m$^3$/day and 98.3%, and the temporal change rate was 2.8%.

Example 16

A separation membrane element was prepared in the same manner as in Example 15 except that the height of the wall-like body was 0.20 mm, and the effective membrane area was 0.51 m$^2$.

The element was placed in a pressure vessel, and the operation was conducted under the conditions described above to obtain permeate water, and consequently the amount of the water produced and the desalination rate were respectively 0.253 m$^3$/day and 98.4%, and the temporal change rate was 2.8%.

Example 17

A separation membrane element was prepared in the same manner as in Example 15 except that the height of the wall-like body was 0.11 mm, and the effective membrane area was 0.56 m$^2$.

The element was placed in a pressure vessel, and the operation was conducted under the conditions described above to obtain permeate water, and consequently the amount of the water produced and the desalination rate were respectively 0.258 m$^3$/day and 98.3%, and the temporal change rate was 2.9%.

Example 18

A separation membrane element was prepared in the same manner as in Example 15 except that the number of the membrane leaves was 1 (leaf length 1,600 mm), and the effective membrane area was 0.49 m$^2$.

The element was placed in a pressure vessel, and the operation was conducted under the conditions described above to obtain permeate water, and consequently the amount of the water produced and the desalination rate were respectively 0.245 m$^3$/day and 98.3%, and the temporal change rate was 2.8%.

Example 19

The separation membrane roll provided with the wall-like body affixed, which was obtained in Example 1, was folded and cut so that an effective area in the separation membrane element was 0.5 m$^2$, and a net (thickness: 510 μm, pitch: 2 mm×2 mm, fiber diameter: 255 μm, projected area ratio: 0.21) was used for the channel material on the feed side to prepare six leaves with a width of 200 mm.

Thereafter, a separation membrane element, around which two leaves were spirally wound while winding around a water collection tube (width: 300 mm, outer diameter: 17 mm, number of holes of 8× two rows in a linear arrangement) made of ABS, was prepared, and a film was wound on the outer circumference of the resulting wound body. The film was secured by a tape, and then after cutting the edges, the end plates were fitted on the edges and filament winding was conducted to prepare a 3-inch element.

The element was placed in a pressure vessel, and the operation was conducted under the conditions described above to obtain permeate water, and consequently the amount of the water produced and the desalination rate were respectively 0.721 m$^3$/day and 98.3%, and the temporal change rate was 2.8%.

Example 20

A separation membrane roll was prepared in the same manner as in Example 1 except that the interval between the channel materials was 1.0 mm and the pitch of the channel material was 1.5 mm in the first direction, and a separation membrane element was prepared in the same manner as in Example 19.

The element was placed in a pressure vessel, and the operation was conducted under the conditions described above to obtain permeate water, and consequently the amount of the water produced and the desalination rate were respectively 0.449 m$^3$/day and 98.1%, and the temporal change rate was 2.8%.

Example 21

A separation membrane roll was prepared in the same manner as in Example 1 except that the interval between the channel materials was changed to 2.0 mm and the pitch of the channel material was changed to 2.5 mm in the first direction, and a separation membrane element was prepared in the same manner as in Example 19.

The element was placed in a pressure vessel, and the operation was conducted under the conditions described above to obtain permeate water, and consequently the amount of the water produced and the desalination rate were respectively 0.246 m$^3$/day and 98.1%, and the temporal change rate was 2.8%.

Example 22

A separation membrane roll was prepared in the same manner as in Example 1 except that a semicircle (diameter: 0.5 mm) was employed as the cross-section shape of the wall-like body, and a separation membrane element was prepared in the same manner as in Example 2.

The element was placed in a pressure vessel, and the operation was conducted under the conditions described above to obtain permeate water, and consequently the amount of the water produced and the desalination rate were respectively 35.3 m$^3$/day and 98.3%, and the temporal change rate was 4.7%.

Example 23

A separation membrane roll was prepared in the same manner as in Example 1 except that a polyester long fiber nonwoven fabric (fiber diameter: 1 decitex, thickness: about 90 μm, air permeability: 1.0 cc/cm$^2$/sec, fiber orientation degree of a surface layer on the porous support layer side: 40°, fiber orientation degree of a surface layer on the side opposite to the porous support layer: 20°) was used as a substrate, and a separation membrane element was prepared in the same manner as in Example 2.

The element was placed in a pressure vessel, and the operation was conducted under the conditions described above to obtain permeate water, and consequently the amount of the water produced and the desalination rate were respectively 35.7 m$^3$/day and 98.4%, and the temporal change rate was 4.5%.

Example 24

A separation membrane element was prepared in the same manner as in Example 2 except that the number of the membrane leaves was 25 (leaf length 850 mm), and the effective membrane area was 37.4 m$^2$.

The element was placed in a pressure vessel, and the operation was conducted under the conditions described above to obtain permeate water, and consequently the amount of the water produced and the desalination rate were respectively 35.9 m$^3$/day and 98.1%, and the temporal change rate was 4.5%.

Example 25

A separation membrane element was prepared in the same manner as in Example 2 except that the number of the membrane leaves was 22 (leaf length 970 mm), and the effective membrane area was 37.7 m$^2$.

The element was placed in a pressure vessel, and the operation was conducted under the conditions described above to obtain permeate water, and consequently the amount of the water produced and the desalination rate were respectively 35.5 m$^3$/day and 98.3%, and the temporal change rate was 4.4%.

Example 26

A separation membrane element was prepared in the same manner as in Example 2 except that the number of the membrane leaves was 18 (leaf length 1,180 mm), and the effective membrane area was 38.0 m$^2$.

The element was placed in a pressure vessel, and the operation was conducted under the conditions described above to obtain permeate water, and consequently the amount of the water produced and the desalination rate were respectively 35.0 m$^3$/day and 98.3%, and the temporal change rate was 4.2%.

Example 27

A separation membrane element was prepared in the same manner as in Example 2 except that the number of the membrane leaves was 11 (leaf length 1,930 mm), and the effective membrane area was 38.7 m$^2$.

The element was placed in a pressure vessel, and the operation was conducted under the conditions described above to obtain permeate water, and consequently the amount of the water produced and the desalination rate were respectively 34.8 m$^3$/day and 98.3%, and the temporal change rate was 4.2%.

Comparative Example 1

A separation membrane element was prepared in the same manner as in Example 2 except that tricot (thickness: 280

μm, width of groove: 400 μm, width of ridge: 300 μm, depth of groove: 105 μm, made of polyethylene terephthalate), having a continuous shape, was used as the channel material to be disposed on the permeate side.

The element was placed in a pressure vessel, and the operation was conducted under the conditions described above to obtain permeate water, and consequently the amount of the water produced and the desalination rate were respectively 30.4 m³/day and 98.2%, and the temporal change rate was 4.2%.

Comparative Example 2

A separation membrane roll was prepared in the same manner as in Example 1 except that ethylene vinyl acetate-based Hot Melt 701A (produced by TEX YEAR INDUSTRIES INC.) was applied onto the permeate side under the conditions of a resin temperature of 125° C. and a running speed of 3 m/min by use of a gravure roll with a carved pattern, which had a projected area ratio of 0.32 and a pitch of 1.0 mm and was in the form of a discontinuously staggered true circle of 0.5 mm in diameter, while maintaining the temperature of a backup roll at 20° C. to bond the resulting channel material which had a height of 0.26 mm, a width of the channel material of 0.5 mm, intervals between channel materials of 0.4 mm in the first and second directions, a pitch of 0.9 mm and a projected area ratio of 0.32 to the whole area of the separation membrane. A separation membrane element was prepared and evaluated in the same manner as in Example 2, and consequently the amount of the water produced and the desalination rate were respectively 36.9 m³/day and 98.0%, and the temporal change rate was 19.3%. The conditions of the channel material and the element performance are shown together in Table 1.

Comparative Example 3

A separation membrane roll was prepared in the same manner as in Example 1 except that ethylene vinyl acetate-based Hot Melt 701A (produced by TEX YEAR INDUSTRIES INC.) was applied onto the permeate side under the conditions of a resin temperature of 125° C. and a running speed of 3 m/min by use of a gravure roll with a carved pattern, which had a projected area ratio of 0.32 and a pitch of 1.0 mm and was in the form of a discontinuously staggered true circle of 0.5 mm in diameter, while maintaining the temperature of a backup roll at 20° C. to bond the resulting channel material which had a height of 0.33 mm, a width of the channel material of 0.5 mm, intervals between channel materials of 0.4 mm in the first and second directions, a pitch of 0.9 mm and a projected area ratio of 0.32 to the whole area of the separation membrane. A separation membrane element was prepared and evaluated in the same manner as in Example 2 except for using the resulting separation membrane roll for a net (thickness: 1.1 mm, pitch: 6 mm×6 mm, fiber diameter: 0.55 mm, projected area ratio: 0.21), and consequently the amount of the water produced and the desalination rate were respectively 27.2 m³/day and 98.4%, and the temporal change rate was 19.0%. The conditions of the channel material and the element performance are shown together in Table 1.

Comparative Example 4

A separation membrane element was prepared and evaluated in the same manner as in Example 2 except that the defect rate was 45%, and consequently the amount of the water produced and the desalination rate were respectively 19.5 m³/day and 98.2%, and the temporal change rate was 4.5%. The conditions of the channel material and the element performance are shown together in Table 1.

Comparative Example 5

A separation membrane element was prepared and evaluated in the same manner as in Example 15 except that tricot (thickness: 280 μm, width of groove: 400 μm, width of ridge: 300 μm, depth of groove: 105 μm, made of polyethylene terephthalate) having a continuous shape was used as the channel material to be disposed on the permeate side, and consequently the amount of the water produced and the desalination rate were respectively 0.200 m³/day and 98.3%, and the temporal change rate was 2.7%. The conditions of the channel material and the element performance are shown together in Table 1.

Comparative Example 6

A separation membrane element was prepared and evaluated in the same manner as in Example 18 except that tricot (thickness: 280 μm, width of groove: 400 μm, width of ridge: 300 μm, depth of groove: 105 μm, made of polyethylene terephthalate) having a continuous shape was used as the channel material to be disposed on the permeate side, and consequently the amount of the water produced and the desalination rate were respectively 0.2020 m³/day and 98.3%, and the temporal change rate was 2.7%. The conditions of the channel material and the element performance are shown together in Table 1.

As is apparent from the results, the separation membranes and the separation membrane elements of Examples have high water production performance, stable operation performance, and excellent removal performance.

Comparative Example 24

A separation membrane element was prepared in the same manner as in Example 2 except that the number of the membrane leaves was 10 (leaf length 2,120 mm), and the effective membrane area was 38.9 m².

The element was placed in a pressure vessel, and the operation was conducted under the conditions described above to obtain permeate water, and consequently the amount of the water produced and the desalination rate were respectively 30.4 m³/day and 98.3%, and the temporal change rate was 4.2%.

TABLE 1

|  |  | Example 1 | Example 2 | Example 3 | Example 4 | Example 5 | Example 6 | Example 7 |
|---|---|---|---|---|---|---|---|---|
| Element | EL Size-Number of Leaves | — | 8 inch-26 | 8 inch-26 | 8 inch-26 | 8 inch-26 | 8 inch-26 | 8 inch-26 |
|  | Effective Membrane Area (m²) | — | 37 | 37 | 37 | 37 | 37 | 37 |

TABLE 1-continued

|  |  | Example 1 | Example 2 | Example 3 | Example 4 | Example 5 | Example 6 | Example 7 |
|---|---|---|---|---|---|---|---|---|
| Separation Membrane Channel Material on Permeate Side | Leaf Length a (mm) | — | 800 | 800 | 800 | 800 | 800 | 800 |
|  | Arrangement | linear | linear | linear | linear | linear | linear | linear |
|  | Material | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A |
|  | Angle between Channel Material and Axial Direction of Water Collection Tube (°) | 90 | 90 | 90 | 90 | 90 | 90 | 90 |
|  | Cross-section Shape | trapezoid | trapezoid | trapezoid | trapezoid | trapezoid | trapezoid | trapezoid |
|  | Height c (mm) | 0.26 | 0.26 | 0.26 | 0.26 | 0.26 | 0.26 | 0.26 |
|  | Upper Base (mm) | 0.45 | 0.45 | 0.45 | 0.45 | 0.45 | 0.45 | 0.45 |
|  | Lower Base (mm) | 0.55 | 0.55 | 0.55 | 0.55 | 0.55 | 0.55 | 0.55 |
|  | Interval b between Channel Materials in First Direction (mm) | 0.40 | 0.40 | 0.40 | 0.40 | 0.40 | 0.40 | 0.40 |
|  | Width d of Channel Material on Permeate Side (mm) | 0.50 | 0.50 | 0.50 | 0.50 | 0.50 | 0.50 | 0.50 |
|  | Interval e between Channel Materials in Second Direction (mm) | 0 | 0 | 0 | 0 | 0 | 0 | 0 |
|  | Length f of Channel Material (mm) | — | 800 | 800 | 800 | 800 | 800 | 800 |
|  | Pitch (mm) | 0.9 | 0.9 | 0.9 | 0.9 | 0.9 | 0.9 | 0.9 |
|  | Projected Area Ratio (df/(b + d)(e + f)) | 0.99 | 0.99 | 0.99 | 0.99 | 0.99 | 0.99 | 0.99 |
|  | Defect Rate (%) | 0 | 0 | 0 | 0 | 12 | 25 | 12 |
|  | Discontinuity of Wall-like Body per Leaf | — | — | 0.3 mm × 10 locations | 1 mm × 10 locations | — | — | 0.3 mm × 10 locations |
| Channel Material on Feed Side | Method of Providing Height Difference | net | net | net | net | net | net | net |
|  | Material | polypropylene | polypropylene | polypropylene | polypropylene | polypropylene | polypropylene | polypropylene |
|  | Emboss Pattern | — | — | — | — | — | — | — |
|  | Processing Temperature (° C.) | — | — | — | — | — | — | — |
|  | Linear Pressure (kg/cm) | — | — | — | — | — | — | — |
|  | Thickness (mm) | 0.70 | 0.70 | 0.70 | 0.70 | 0.70 | 0.70 | 0.70 |
|  | Fiber Diameter (mm) | 0.35 | 0.35 | 0.35 | 0.35 | 0.35 | 0.35 | 0.35 |
|  | Pitch (mm) | 5 | 5 | 5 | 5 | 5 | 5 | 5 |
|  | Projected Area Ratio | 0.13 | 0.13 | 0.13 | 0.13 | 0.13 | 0.13 | 0.13 |
| Separation Membrane Performance | Amount of Water Produced ($m^3/m^2/day$) | 1.01 | — | — | — | — | — | — |
|  | Desalination Rate (%) | 98.2 | — | — | — | — | — | — |
| Element Performance | Amount of Water Produced ($m^2/day$) | — | 35.8 | 36.0 | 36.1 | 32.7 | 28.9 | 28.7 |
|  | Desalination Rate (%) | — | 98.2 | 98.0 | 97.8 | 98.2 | 98.2 | 98.2 |
|  | Temporal Change Rate (%) | — | 4.6 | 4.7 | 4.9 | 4.6 | 4.6 | 4.6 |

TABLE 2

|  |  | Example 8 | Example 9 | Example 10 | Example 11 | Example 12 | Example 13 | Example 14 |
|---|---|---|---|---|---|---|---|---|
| Element | EL Size-Number of Leaves | 8 inch-26 | 8 inch-26 | 8 inch-26 | 8 inch-26 | 8 inch-26 | 8 inch-26 | 8 inch-26 |
|  | Effective Membrane Area ($m^2$) | 37 | 37 | 37 | 37 | 36 | 34 | 31 |
| Separation Membrane Channel Material on Permeate Side | Leaf Length a (mm) | 800 | 800 | 800 | 800 | 800 | 800 | 800 |
|  | Arrangement | linear | linear | linear | linear | linear | linear | linear |
|  | Material | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A |
|  | Angle between Channel Material and Axial Direction of Water Collection Tube (°) | 80 | 65 | 100 | 90 | 90 | 90 | 90 |
|  | Cross-section Shape | trapezoid | trapezoid | trapezoid | trapezoid | trapezoid | trapezoid | trapezoid |
|  | Height c (mm) | 0.26 | 0.26 | 0.26 | 0.26 | 0.26 | 0.26 | 0.26 |
|  | Upper Base (mm) | 0.45 | 0.45 | 0.45 | 0.45 | 0.45 | 0.45 | 0.45 |
|  | Lower Base (mm) | 0.55 | 0.55 | 0.55 | 0.55 | 0.55 | 0.55 | 0.55 |
|  | Interval b between Channel Materials in First Direction (mm) | 0.40 | 0.40 | 0.40 | 0.40 | 0.40 | 0.40 | 0.40 |

TABLE 2-continued

|  |  | Example 8 | Example 9 | Example 10 | Example 11 | Example 12 | Example 13 | Example 14 |
|---|---|---|---|---|---|---|---|---|
|  | Width d of Channel Material on Permeate Side (mm) | 0.50 | 0.50 | 0.50 | 0.50 | 0.50 | 0.50 | 0.50 |
|  | Interval e between Channel Materials in Second Direction (mm) | 0 | 0 | 0 | 0 | 0 | 0 | 0 |
|  | Length f of Channel Material (mm) | 800 | 800 | 800 | 800 | 800 | 800 | 800 |
|  | Pitch (mm) | 0.9 | 0.9 | 0.9 | 0.9 | 0.9 | 0.9 | 0.9 |
|  | Projected Area Ratio (df/(b + d)(e + f)) | 0.99 | 0.53 | 0.55 | 0.55 | 0.99 | 0.99 | 0.55 |
|  | Defect Rate (%) | 0 | 0 | 0 | 0 | 0 | 0 | 0 |
|  | Discontinuity of Wall-like Body per Leaf | — | — | — | — | — | — | — |
| Channel Material on Feed Side | Method of Providing Height Difference | net | net | net | embossing | net | net | net |
|  | Material | poly-propylene | poly-propylene | poly-propylene | — | poly-ethylene | poly-ethylene | poly-ethylene |
|  | Emboss Pattern | — | — | — | net-shape | — | — | — |
|  | Processing Temperature (° C.) | — | — | — | 120 | — | — | — |
|  | Linear Pressure (kg/cm) | — | — | — | 60 | — | — | — |
|  | Thickness (mm) | 0.70 | 0.70 | 0.70 | 0.35 | 0.70 | 0.55 | 0.95 |
|  | Fiber Diameter (mm) | 0.35 | 0.35 | 0.35 | — | 0.35 | 0.35 | 0.35 |
|  | Pitch (mm) | 5 | 5 | 5 | 5 | 5 | 5 | 5 |
|  | Projected Area Ratio | 0.13 | 0.13 | 0.13 | 0.13 | 0.13 | 0.13 | 0.13 |
| Separation Membrane Performance | Amount of Water Produced (m³/m²/day) | — | — | — | — | — | — | — |
|  | Desalination Rate (%) | — | — | — | — | — | — | — |
| Element Performance | Amount of Water Produced (m²/day) | 24.7 | 34.3 | 34.6 | 36.0 | 25.6 | 32.1 | 28.5 |
|  | Desalination Rate (%) | 98.3 | 98.3 | 98.3 | 97.6 | 98.4 | 98.6 | 98.7 |
|  | Temporal Change Rate (%) | 4.6 | 4.7 | 4.6 | 5.9 | 4.2 | 4.6 | 4.5 |

TABLE 3

|  |  | Example 15 | Example 16 | Example 17 | Example 18 | Example 19 | Example 20 | Example 21 |
|---|---|---|---|---|---|---|---|---|
| Element | EL Size-Number of Leaves | 2 inch-2 | 2 inch-2 | 2 inch-2 | 2 inch-1 | 3 inch-6 | 3 inch-6 | 3 inch-6 |
|  | Effective Membrane Area (m²) | 0.48 | 0.51 | 0.56 | 0.49 | 1.4 | 1.4 | 1.4 |
| Separation Membrane | Leaf Length a (mm) | 800 | 800 | 800 | 1600 | 800 | 800 | 800 |
| Channel Material on Permeate Side | Arrangement | linear | linear | linear | linear | linear | linear | linear |
|  | Material | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A |
|  | Angle between Channel Material and Axial Direction of Water Collection Tube (°) | 90 | 90 | 90 | 90 | 90 | 90 | 90 |
|  | Cross-section Shape | trapezoid | trapezoid | trapezoid | trapezoid | trapezoid | trapezoid | trapezoid |
|  | Height c (mm) | 0.26 | 0.20 | 0.11 | 0.26 | 0.26 | 0.26 | 0.26 |
|  | Upper Base (mm) | 0.45 | 0.45 | 0.45 | 0.45 | 0.45 | 0.45 | 0.45 |
|  | Lower Base (mm) | 0.55 | 0.55 | 0.55 | 0.55 | 0.55 | 0.55 | 0.55 |
|  | Interval b between Channel Materials in First Direction (mm) | 0.40 | 0.40 | 0.40 | 0.40 | 0.50 | 1.0 | 2.0 |
|  | Width d of Channel Material on Permeate Side (mm) | 0.50 | 0.50 | 0.50 | 0.50 | 0.50 | 0.50 | 0.50 |
|  | Interval e between Channel Materials in Second Direction (mm) | 0 | 0 | 0 | 0 | 0 | 0 | 0 |
|  | Length f of Channel Material (mm) | 800 | 800 | 500 | 1600 | 800 | 800 | 500 |
|  | Pitch (mm) | 0.9 | 0.9 | 0.9 | 0.9 | 0.9 | 1.5 | 1.5 |
|  | Projected Area Ratio (df/(b + d)(e + f)) | 0.55 | 0.55 | 0.55 | 0.55 | 0.55 | 0.32 | 0.33 |
|  | $(a^2 f^2 (b + c)^2 (b + d) \times 10^{-1})/b^3 c^3 (e + f)^2$ | not calculated | not calculated | not calculated | 890 | not calculated | not calculated | not calculated |
|  | Defect Rate (%) | 0 | 0 | 0 | 0 | 0 | 0 | 0 |
|  | Discontinuity of Wall-like Body per One Leaf | — | — | — | — | — | — | — |

TABLE 3-continued

|  |  | Example 15 | Example 16 | Example 17 | Example 18 | Example 19 | Example 20 | Example 21 |
|---|---|---|---|---|---|---|---|---|
| Channel Material on Feed Side | Method of Providing Height Difference | net | net | net | net | net | net | net |
|  | Material | poly-ethylene | poly-ethylene | poly-ethylene | poly-ethylene | poly-ethylene | poly-ethylene | poly-ethylene |
|  | Emboss Pattern | — | — | — | — | — | — | — |
|  | Processing Temperature (° C.) | — | — | — | — | — | — | — |
|  | Linear Pressure | — | — | — | — | — | — | — |
|  | Thickness (mm) | 0.81 | 0.51 | 0.51 | 0.81 | 0.51 | 0.51 | 0.51 |
|  | Fiber Diameter (mm) | 0.25 | 0.25 | 0.25 | 0.25 | 0.25 | 0.25 | 0.25 |
|  | Pitch (mm) | 2 | 2 | 2 | 2 | 2 | 2 | 2 |
|  | Projected Area Ratio | 0.21 | 0.21 | 0.21 | 0.21 | 0.21 | 0.21 | 0.21 |
| Separation Membrane Performance | Amount of Water Produced ($m^3/m^2/day$) | — | — | — | — | — | — | — |
|  | Desalination Rate (%) | — | — | — | — | — | — | — |
| Element Performance | Amount of Water Produced ($m^2/day$) | 0.241 | 0.263 | 0.258 | 0.245 | 0.721 | 0.449 | 0.246 |
|  | Desalination Rate (%) | 98.2 | 93.4 | 98.2 | 98.2 | 98.3 | 98.1 | 98.1 |
|  | Temporal Change Rate (%) | 2.8 | 2.8 | 2.8 | 2.8 | 2.8 | 2.8 | 2.8 |

TABLE 4

|  |  | Example 22 | Example 23 | Example 24 | Example 25 | Example 26 | Example 27 |
|---|---|---|---|---|---|---|---|
| Element | EL Size-Number of Leaves | 8 inch-26 | 8 inch-26 | 8 inch-26 | 8 inch-26 | 8 inch-26 | 8 inch-26 |
|  | Effective Membrane Area ($m^2$) | 37 | 37 | 37.4 | 37.7 | 38.0 | 38.7 |
| Separation Membrane | Leaf Length a (mm) | 800 | 800 | 850 | 970 | 1180 | 1930 |
| Channel Material on Permeate Side | Arrangement | linear | linear | linear | linear | linear | linear |
|  | Material | EVA-based Hot Melt 701A | EVA-based Hot Melt 701A | EVA-based Hot Melt 701A | EVA-based Hot Melt 701A | EVA-based Hot Melt 701A | EVA-based Hot Melt 701A |
|  | Angle between Channel Material and Axial Direction of Water Collection Tube (°) | 90 | 90 | 90 | 90 | 90 | 90 |
|  | Cross-section Shape | semicircle | trapezoid | trapezoid | trapezoid | trapezoid | trapezoid |
|  | Height c (mm) | 0.5 (diameter) | 0.60 | 0.50 | 0.26 | 0.26 | 0.26 |
|  | Upper Base (mm) | — | 0.45 | 0.45 | 0.45 | 0.45 | 0.45 |
|  | Lower Base (mm) | 0.55 | 0.55 | 0.55 | 0.55 | 0.55 | 0.55 |
|  | Interval b between Channel Materials in First Direction (mm) | 0.40 | 0.40 | 0.40 | 0.40 | 0.40 | 0.40 |
|  | Width d of Channel Material on Permeate Side (mm) | 0.50 | 0.50 | 0.50 | 0.50 | 0.50 | 0.50 |
|  | Interval e between Channel Materials in Second Direction (mm) | 0 | 0 | 0 | 0 | 0 | 0 |
|  | Length f of Channel Material (mm) | 800 | 800 | 500 | 970 | 1180 | 1930 |
|  | Pitch (mm) | 1.0 | 1.0 | 1.0 | 0.9 | 0.9 | 0.9 |
|  | Projected Area Ratio (df/(b + d)(e + f)) | 0.55 | 0.55 | 0.55 | 0.55 | 0.55 | 0.55 |
|  | $(a^2f^2(b+c)^3(b+d) \times 10^{-1})/b^2c^2(e+f)^2$ | not calculated | not calculated | 252 | 325 | 486 | 1301 |
|  | Defect Rate (%) | 0 | 0 | 0 | 0 | 0 | 0 |
|  | Discontinuity of Wall-like Body per One Leaf | — | — | — | — | — | — |
| Channel Material on Feed Side | Method of Providing Height Difference | net | net | net | net | net | net |
|  | Material | poly-ethylene | poly-ethylene | poly-ethylene | poly-ethylene | poly-ethylene | poly-ethylene |
|  | Emboss Pattern | — | — | — | — | — | — |
|  | Processing Temperature (° C.) | — | — | — | — | — | — |
|  | Linear Pressure (kg/cm) | — | — | — | — | — | — |
|  | Thickness (mm) | 0.70 | 0.70 | 0.70 | 0.51 | 0.51 | 0.51 |
|  | Fiber Diameter (mm) | 0.35 | 0.35 | 0.35 | 0.26 | 0.25 | 0.25 |
|  | Pitch (mm) | 5 | 5 | 5 | 2 | 2 | 2 |
|  | Projected Area Ratio | 0.13 | 0.13 | 0.13 | 0.21 | 0.21 | 0.21 |

TABLE 4-continued

|  |  | Example 22 | Example 23 | Example 24 | Example 25 | Example 26 | Example 27 |
|---|---|---|---|---|---|---|---|
| Separation Membrane Performance | Amount of Water Produced ($m^3/m^2/day$) | — | — | — | — | — | — |
|  | Desalination Rate (%) | — | — | — | — | — | — |
| Element Performance | Amount of Water Produced ($m^3/day$) | 36.3 | 35.7 | 35.9 | 35.5 | 36.0 | 34.8 |
|  | Desalination Rate (%) | 98.3 | 98.4 | 98.1 | 95.3 | 98.3 | 98.2 |
|  | Temporal Change Rate (%) | 4.7 | 4.5 | 4.5 | 4.4 | 4.2 | 4.2 |

TABLE 5

|  |  | Comparative Example 1 | Comparative Example 2 | Comparative Example 3 | Comparative Example 4 | Comparative Example 5 | Comparative Example 6 |
|---|---|---|---|---|---|---|---|
| Element | EL Size-Number of Leaves | 8 inch-26 | 8 inch-26 | 8 inch-26 | 8 inch-26 | 2-inch-2 | 8 inch-10 |
|  | Effective Membrane Area ($m^2$) | 37 | 37 | 37 | 27 | 0.48 | 38.9 |
| Separation Membrane | Leaf Length a (mm) | 800 | 800 | 800 | 800 | 800 | 2120 |
| Different Material | Arrangement | — | dot-like | dot-like | linear | — | linear |
|  | Material | — | EVA-based Hot Melt 701A | ethylene-vinyl acetate copolymer | EVA-based Hot Melt 701A | — | EVA-based Hot Melt 701A |
|  | Angle Formed by Channel Material and Axial Direction of Water Collection Tube (°) | — | 90 | 90 | 90 | — | 90 |
|  | Cross-section Shape | — | semicircle | semicircle | trapezoid | — | trapezoid |
|  | Height c (mm) | — | 0.26 | 0.26 | 0.26 | — | 0.26 |
|  | Upper Base (mm) | — | 0.5 (diameter) | 0.80 | 0.45 | — | 0.45 |
|  | Lower Base (mm) | — | — | 1.00 | 0.55 | — | 0.58 |
|  | Interval b between Channel Materials in First Direction (mm) | — | 0.40 | 0.50 | 0.40 | — | — |
|  | Width d of Channel Material on Permeate Side (mm) | — | 0.50 | 0.50 | 0.50 | — | 0.50 |
|  | Interval e between Channel Materials in Second Direction (mm) | — | 0.40 | 0.40 | 0.00 | — | 0.00 |
|  | Length f of Channel Material (mm) | — | — | — | — | — | 970 |
|  | Pitch (mm) | — | 0.9 | 1.4 | 1.0 | — | 0.9 |
|  | Projected Area Ratio (df/(b + d)(e + f)) | — | 0.32 | 0.32 | 0.55 | — | 0.55 |
|  | $(a^2f^2(b + c)^3(b + d) \times 10^{-1})/b^2c^2(e + f)^2$ | — | not calculated | not calculated | not calculated | not calculated | 1570 |
|  | Defect Rate (%) | — | 0 | 0 | 45 | — | — |
|  | Discontinuity of Wall-like Body per One Leaf | — | 0.4 mm × 1000 locations | 0.9 mm × 500 locations | — | — | — |
| Channel Material on Feed Side | Method of Providing Height Difference | net | net | net | net | net | net |
|  | Material | polypropylene | polypropylene | polypropylene | polypropylene | polyethylene | polyethylene |
|  | Emboss Pattern | — | — | — | — | — | — |
|  | Processing Temperature (° C.) | — | — | — | — | — | — |
|  | Linear Pressure (kg/cm) | — | — | — | — | — | — |
|  | Thickness (mm) | 0.70 | 0.70 | 1.10 | 1.10 | 0.81 | 0.81 |
|  | Fiber Diameter (mm) | 0.35 | 0.35 | 0.55 |  | 0.25 | 0.25 |
|  | Pitch (mm) | 5 | 5 | 5 |  | 2 | 2 |
|  | Projected Area Ratio | 0.13 | 0.13 | 0.21 | 0.13 | 0.21 | 0.21 |
| Separation Membrane Performance | Amount of Water Produced ($m^3/m^2/day$) | — | — | — | — | — | — |
|  | Desalination Rate (%) | — | — | — | — | — | — |
| Element Performance | Amount of Water Produced ($m^3/day$) | 20.4 | 26.9 | 27.2 | 19.5 | 0.200 | 20.4 |
|  | Desalination Rate (%) | 98.2 | 98.0 | 98.4 | 98.2 | 98.3 | 98.3 |
|  | Temporal Change Rate (%) | 4.2 | 19.3 | 19.0 | 4.5 | 2.7 | 4.2 |

INDUSTRIAL APPLICABILITY

Our membrane elements can be particularly suitably used in desalination of brackish water and sea water.

The invention claimed is:

1. A separation membrane element comprising a water collection tube, and a separation membrane comprising:
    a separation membrane main body having at least a substrate and a separation functional layer; and
    a channel material disposed on a permeate side of the separation membrane main body, the channel material having a composition different from a composition of any layer constituting the separation membrane main body and affixed to a substrate-side surface of the separation membrane main body,
    wherein the channel material is discontinuous in a first direction and continuous in a second direction from one end to another end of the separation membrane main body, wherein
    the separation membrane is arranged such that the first direction is along an axial direction of the water collection tube and wound around the water collection tube.

2. The separation membrane element according to claim 1, wherein a difference in height between the channel material and the substrate-side surface of the separation membrane is 0.03 mm or more and 0.8 mm or less.

3. The separation membrane element according to claim 1, wherein an interval between the channel materials adjacent to each other in the first direction is 0.05 mm or more and 5 mm or less.

4. The separation membrane element according to claim 1, wherein a difference in height between the channel materials adjacent to each other is 0.1 mm or less.

5. The separation membrane element according to claim 1, wherein a maximum value of height differences among the channel materials disposed in the separation membrane is 0.25 mm or less.

6. The separation membrane element according to claim 1, wherein the channel material is formed of a thermoplastic resin.

7. The separation membrane element according to claim 1, further comprising a porous support layer, wherein
    the porous support layer is disposed between the substrate and the separation functional layer; and
    the substrate is a long fiber nonwoven fabric.

8. The separation membrane element according to claim 7, wherein fibers at the surface layer opposite to the porous support layer-side surface layer of the long fiber nonwoven fabric are more vertically oriented than those at the porous support layer-side surface layer.

9. The separation membrane element according to claim 1, wherein a length a of the separation membrane main body in the second direction, an interval b between the channel materials in the first direction, a difference in height c between the channel material and a permeate-side surface of the separation membrane main body, a width d of the channel material in the first direction, an interval e between the channel materials in the second direction, and a length f of the channel material in the second direction satisfy:

$a^2 f^2 (b+c)^2 (b+d) \times 10^{-6}/b^3 c^3 (e+f)^2 \leq 1400$,   i)

$850 \leq a \leq 7000$,   ii)

$b \leq 2$,   iii)

$c \leq 0.5$, and   iv)

$0.15 \leq df/(b+d)(e+f) \leq 0.85$.   v)

* * * * *

UNITED STATES PATENT AND TRADEMARK OFFICE
CERTIFICATE OF CORRECTION

PATENT NO. : 9,616,390 B2
APPLICATION NO. : 14/131231
DATED : April 11, 2017
INVENTOR(S) : Hirozawa et al.

It is certified that error appears in the above-identified patent and that said Letters Patent is hereby corrected as shown below:

In the Specification

In Column 23
At Line 59, please change "for producing" to -- to produce --.

In Column 37
At Table 2-continued, at Example 8, row 20, please change "24.7" to -- 34.7 --.

In Columns 39 and 40
At Table 3-continued, at Example 15, row 7, please change "0.81" to -- 0.51 --; at row 22, please change "98.2" to -- 98.3 --; at Example 16, row 13, please change "0.263" to -- 0.253 --; at Example 17, row 14, please change "98.2" to -- 98.3 --; at Example 18, row 7, please change "0.81" to -- 0.51 --; and at row 14, please change "98.2" to -- 98.3 --.

In Columns 41 and 42
At Table 4-continued, at Example 27, row 4, please change "98.2" to -- 98.3 --.
At Table 5, at Comparative Example 1, row 32, please change "20.4" to -- 30.4 --; at Comparative Example 2, row 32, please change "26.9" to -- 36.9 --; at Comparative Example 3, row 2, please change "37" to -- 27 --; at Comparative Example 6, at row 12, please change "0.58" to -- .055 --; and at row 32, please change "20.4" to -- 30.3 --.

Signed and Sealed this
Second Day of January, 2018

Joseph Matal
*Performing the Functions and Duties of the
Under Secretary of Commerce for Intellectual Property and
Director of the United States Patent and Trademark Office*